(12) United States Patent
Han

(10) Patent No.: US 7,951,040 B2
(45) Date of Patent: May 31, 2011

(54) TRIPLE-AXLE-DRIVE VARIABLE TRANSMISSION FOR HEAVY MACHINERY

(75) Inventor: Seung Woo Han, Incheon (KR)

(73) Assignee: Wooyoung Hydraulics Co., Ltd., Incheon (KR)

( * ) Notice: Subject to any disclaimer, the term of this patent is extended or adjusted under 35 U.S.C. 154(b) by 454 days.

(21) Appl. No.: 12/154,842

(22) Filed: May 27, 2008

(65) Prior Publication Data

US 2010/0048339 A1    Feb. 25, 2010

Related U.S. Application Data

(63) Continuation of application No. PCT/KR2006/004297, filed on Oct. 20, 2006.

(30) Foreign Application Priority Data

Oct. 25, 2005  (KR) .................. 10-2005-0100617

(51) Int. Cl.
*F16H 3/44* (2006.01)
(52) U.S. Cl. ...................... 475/296; 475/276
(58) Field of Classification Search .......... 475/275–278, 475/284, 296
See application file for complete search history.

(56) References Cited

U.S. PATENT DOCUMENTS

| | | | |
|---|---|---|---|
| 3,971,268 A * | 7/1976 | Murakami et al. | 475/276 |
| 4,038,888 A * | 8/1977 | Murakami et al. | 475/276 |
| 4,624,154 A * | 11/1986 | Kraft et al. | 475/66 |
| 5,135,071 A | 8/1992 | Shibahata et al. | |
| 6,634,980 B1 * | 10/2003 | Ziemer | 475/275 |
| 7,118,509 B2 * | 10/2006 | Tabata et al. | 475/276 |
| 2005/0266951 A1 | 12/2005 | Han | |

FOREIGN PATENT DOCUMENTS

WO    WO 2006/104294    10/2006

OTHER PUBLICATIONS

International Search Report and Opinion of ISA in PCT/KR2006/004297, Feb. 16, 2007.

* cited by examiner

*Primary Examiner* — Ha D. Ho
(74) *Attorney, Agent, or Firm* — Bacon & Thomas PLLC

(57) ABSTRACT

A triple-axle-drive multistage transmission for heavy machinery includes an input part and a speed changing part. The input part includes a clutch part including a forward clutch part and a reverse clutch part to control transmission of the power received from a bevel gear unit, an input drive shaft coupled to the forward clutch part to mediate forward power transmission, a forward drive gear provided on a first end of the input drive shaft, and a reverse drive gear coupled to the reverse clutch part. The speed changing part includes a speed change drive shaft to mediate a change of speed of the power input from the input part, a planetary gear unit coupled to a first end of the speed changed drive shaft, and a reverse driven gear provided on a second end of the speed change drive shaft and engaging with the reverse drive gear.

8 Claims, 15 Drawing Sheets

TRIPLE-AXLE-DRIVE VARIABLE TRANSMISSION FOR HEAVY MACHINERY

This application is a Continuation Application of PCT International Application No. PCT/KR2006/004297 filed on Oct. 20, 2006, which designated the United States.

FIELD OF THE INVENTION

The present invention relates, in general, to transmissions for heavy machinery and, more particularly, to a triple-axle-drive multistage transmission for heavy machinery which is provided between a bevel gear unit and receives the rotating power output from an engine, and a differential gear unit, which outputs the rotating power, having been changed in speed, and transmits the power to a wheel shaft, thus conducting a multistage gear shifting operation, including three forward speeds and two reverse speeds, using a clutch operated by hydraulic pressure and gear sets.

BACKGROUND OF THE INVENTION

Generally, heavy machinery, such as excavators and forklifts, do not need to travel at high speed in order to serve their purpose. Therefore, it is sufficient for such heavy machinery to be shiftable between only two or three forward and reverse speeds so as to achieve its intended purpose.

As a representative technique related to the gear shifting system having three forward speeds and two reverse speeds, a transmission for heavy machinery, which is constructed such that it is directly coupled to a torque converter, connected to an output shaft of an engine to output power, and conducts gear shifting using a plurality of clutches and gear sets and transmits the power to a wheel shaft through a bevel gear unit, that is, such that the power is transmitted in the sequence of engine-transmission-bevel gear unit-differential gear unit-wheel shaft, was proposed in Korean Patent Laid-open Publication No. 2000-15284.

However, because the above-mentioned transmission is directly coupled to the torque converter without a reduction gear, gear shift shock in the transmission is excessive during a process of changing the speed of the engine output. Particularly, in order to shift the transmission from forward to reverse or from reverse to forward, the direction in which bevel gears of the bevel gear unit are rotated must be reversed. Therefore, there is a problem in that gear shift shock in the bevel gear unit is increased at the conversion point between the forward and reverse gears, thus increasing noise and deteriorating riding comfort.

In an effort to overcome the above problems, the inventor of the present invention proposed a transmission in Korean Patent Application No. 10-2004-2909, wherein the transmission is disposed between a bevel gear unit and a differential gear unit such that power transmission is conducted in a sequence of engine-bevel gear unit-transmission-differential gear unit-wheel shaft. In this technique, the power of an engine, which is first reduced in speed through the bevel gear unit, is input to the transmission. To shift the transmission to forward or reverse gear, hydraulic pressure is selectively applied to a forward clutch part or a reverse clutch part, thus controlling forward and reverse power transmission. Therefore, when the transmission is shifted to forward or reverse gear, the direction of the bevel gear unit can be maintained constant without changing. Thus, gear shift shock induced upon conversion between forward and reverse gear shifts is markedly reduced. In the transmission structure having such a power transmitting system, the bevel gear unit, the differential gear unit and the transmission are integrated into a single body, so that separate space for the transmission is not required, thus enhancing spatial freedom in designing the vehicle. In addition, because the power transmitting system is simplified, the weight of the vehicle and the number of elements are markedly reduced.

Furthermore, the inventor of the present invention proposed a compact transmission, which has a function of preventing heavy machinery from being momentarily moved backwards on an upward slope when gear shifting is conducted for forward movement, thus ensuring stability in work, in Korean Patent Application No. 10-2005-15918. The compact transmission according to this technique has a structure such that a subsidiary forward clutch part is additionally provided between the forward clutch part and the reverse clutch part of the transmission structure disclosed in Korean Patent Application No. 10-2004-2909. Thus, when the vehicle is in a stopped position or moves forwards, hydraulic pressure is supplied to a subsidiary forward clutch part to apply subsidiary forward power to the wheel shaft, thus preventing the vehicle from being moved backwards. As well, in the compact transmission, a one-way bearing is preferably provided in the subsidiary forward clutch part, such that only forward rotating power is transmitted to the wheel shaft, thus fundamentally preventing the vehicle from being moved backwards on the upward slope.

Moreover, the inventor of the present invention proposed, in Korean Patent Application No. 10-2005-26259, a multistage transmission, which is constructed such that, in the transmission structure having the power transmitting system of the engine-bevel gear unit-transmission-differential gear unit-wheel shaft, a separate planetary gear unit is provided on a power shaft connecting the transmission and the differential gear unit to each other, so that gear shifting including three forward speeds and two reverse speeds can be conducted, thus enhancing the operability of the vehicle. This technique will be regarded as the conventional art (hereinafter, referred to as 'conventional multistage transmission') and is explained in detail herein below.

FIG. 1 is a sectional view showing the construction of the conventional multistage transmission proposed by the inventor of the present invention.

As shown in the drawing, the conventional multistage transmission comprises a speed changing clutch part 2 and a planetary gear part 4. The speed changing clutch part 2 has a first clutch assembly 2a which is integrally coupled to a bevel ring gear 1 to receive power from the bevel ring gear 1, and a second clutch assembly 2b which is coupled to the first clutch assembly 2a and rotates integrally with the first clutch assembly 2a. The planetary gear part 4 has a first planetary gear assembly 4a, a second planetary gear assembly 4b and a reverse planetary gear assembly 4c. The planetary gear part 4 changes the speed of the power, transmitted from the speed changing clutch part 2, using the planetary gear sets.

The conventional multistage transmission further includes a stopping clutch part 3, a main drive gear 8a and a first carrier shaft 5c. The stopping clutch part 3 has a sun gear stopping clutch part 3a, a second carrier stopping clutch part 3b, a second ring gear stopping clutch part 3c and a reverse ring gear stopping clutch part 3d which respectively stop first, second and reverse sun gears 5a, 6a and 7a, a second carrier shaft 6d, a second ring gear 6c and a reverse carrier shaft 7d. The main drive gear 8a extends at a first end thereof inside the first clutch assembly 2a and is coupled at a second end thereof to a first ring gear 5c of the first planetary gear assembly 4a. The first carrier shaft 5c extends at a first end thereof inside the second clutch assembly 2b and is integrally coupled at a second end thereof to a rotating shaft of a first planetary gear 5b of the first planetary gear assembly 4a.

Meanwhile, the differential gear unit 8, which is coupled to a rear end of the transmission, and a wheel drive unit 9, which is coupled to the differential gear unit 80, are sequentially coupled to the conventional multistage transmission, but these are not shown in the drawings.

However, in the conventional multistage transmission having the above-mentioned construction, the main drive shaft 8b must be relatively long, because the several sun gears 5a, 6a and 7a are provided on the main drive shaft 8b and gear shifting is conducted by the several planetary assemblies 4a, 4b and 4c, which respectively engage with the sun gears 5a, 6a and 7a. Particularly, because the input and output of power according to multistage gear shifting are implemented through the single main drive shaft 8b, there are problems in that the structural strength and stability of the transmission are reduced by work tolerance, and torsional instability results. To solve such problems, more precise machining is required. Therefore, the cost of manufacturing the transmission is increased.

Furthermore, in the conventional multistage transmission, multistage forward gear shifting and reverse gear shifting using the planetary gear assemblies is implemented using a construction such that the first carrier shaft and the second carrier shaft are used as an input shaft and the first ring gear is used as an output shaft. Accordingly, there is a problem in that the internal gear engagement makes it difficult to determine the reduction gear ratio.

In addition, in the conventional multistage transmission, due to structural and operational instabilities, there are technical limits in designing a transmission that has a function of preventing a vehicle from being momentarily moved backwards on an upward slope and also has the multistage forward and reverse gear shifting function, and in increasing the functionality thereof.

Therefore, it is required to develop a multistage transmission, which is provided between a bevel gear unit and a differential gear unit so that it has the advantages of the conventional multistage transmission, has superior structural strength and operational stability, facilitates determination of a reduction gear ratio, and has a function of preventing a vehicle from being momentarily moved backwards.

SUMMARY OF THE INVENTION

Accordingly, the present invention has been made keeping in mind the above problems occurring in the prior art, and an object of the present invention is to provide a triple-axle-drive multistage transmission for heavy machinery which has a structure such that the main drive shaft of the conventional multistage transmission is separated into an input drive shaft, which transmits engine power controlled in forward and reverse directions, and a speed change drive shaft, which transmits the power, the speed of which has been changed by a planetary gear unit, thus enhancing structural strength and operational stability.

Another object of the present invention is to provide a triple-axle-drive multistage transmission for heavy machinery in which a reduction gear ratio is more easily determined because gears, provided on the input drive shaft and the speed change drive shaft, are externally engaged.

Still another object of the present invention is to provide a triple-axle-drive multistage transmission for heavy machinery which is able to prevent the heavy machinery from being momentarily moved backwards when the heavy machinery is in a neutral gear position or conducts a gear shift operation to move forwards on an upward slope.

In order to accomplish the above objects, the present invention provides a triple-axle-drive multistage transmission for heavy machinery, which is disposed between a bevel gear unit, receiving power from a torque converter coupled to an output shaft of an engine, and a differential gear unit, coupled to a wheel shaft to output the power, changed in speed, the triple-axle-drive multistage transmission including: an input part, having a clutch part including a forward clutch part and a reverse clutch part to control transmission of the power received from the bevel gear unit depending on whether the heavy machinery moves forwards or backwards, an input drive shaft coupled to the forward clutch part to mediate forward power transmission, a forward drive gear provided on a first end of the input drive shaft to transmit forward power, an input drive shaft stopping unit to restrain rotation of the input drive shaft, and a reverse drive gear coupled to the reverse clutch part to transmit backward power; and a speed changing part, having a speed change drive shaft to mediate a change of speed of the power input from the input part, a planetary gear unit coupled to a first end of the speed changed drive shaft and having a first planetary gear assembly and a second planetary gear assembly, which respectively include first and second ring gears, first and second planetary gears, first and second carrier shafts and the first and second sun gears, to receive the power from the forward drive gear, a reverse driven, gear provided on a second end of the speed change drive shaft and engaging with the reverse drive gear to transmit the input power to the speed change drive shaft, and a speed change drive shaft stopping unit and a first carrier shaft stopping unit to respectively restrain rotation of the speed change drive shaft and the first carrier shaft of the first planetary gear assembly, wherein the power, changed in speed, through the planetary gear unit, is output to the wheel shaft through the differential gear unit.

Furthermore, the triple-axle-drive multistage transmission for the heavy machinery may further include an output part, having a forward first speed drive gear to receive the power, changed to forward first speed, from the first ring gear of the first planetary gear assembly, an output driven gear to receive the power, changed in speed, from the second ring gear of the second planetary gear assembly, the differential gear unit to receive the power, changed in speed, from the forward first speed drive gear and the output driven gear and to output the power to the wheel shaft, and a forward first speed clutch part to selectively transmit the power, changed to forward first speed through the forward first speed drive gear, to the differential gear unit.

Preferably, the forward clutch part and the reverse clutch part may respectively include: a hollow forward clutch drum and a hollow reverse clutch drum, which have cylinders in first ends thereof; a forward piston and a reverse piston, which are supported by springs and are respectively installed in the cylinders and move in longitudinal directions using hydraulic oil; frictional plates, which are respectively coupled to circumferential inner surfaces of second ends of the forward clutch drum and the reverse clutch drum and are spaced apart from each other; a forward coupling, which is integrally coupled to the input drive shaft and extends inside the forward clutch drum, and a reverse coupling, which extends inside the reverse clutch drum and is integrated with a reverse drive gear that rotates independently from the input drive shaft; frictional disks, which are respectively coupled to circumferential outer surfaces of the forward coupling and the reverse coupling and alternate with and are spaced apart from the respective frictional plates at regular intervals.

In addition, the input part may further have a hydraulic pressure supply shaft, which is provided on the first end of the input drive shaft and has therein a passage to supply hydraulic pressure to the clutch part. The input drive shaft stopping unit, the speed change drive shaft stopping unit and the first carrier shaft stopping unit may respectively have: frictional plates, which are coupled to a housing; an input drive shaft stopping coupling, a speed change drive shaft stopping coupling, and a first carrier shaft stopping coupling, which are respectively splined to the input drive shaft, the speed change drive shaft and the first carrier shaft; frictional disks, which are respectively coupled to circumferential outer surfaces of the input drive shaft stopping coupling, the speed change drive shaft stopping coupling and the first carrier shaft stopping coupling and respectively alternate with the frictional plates; and pistons, which are respectively installed in cylinders, provided at predetermined positions in the housing, and are movable in longitudinal directions.

As well, the forward first speed clutch part may include: a forward first clutch drum having a cylinder at a predetermined position therein, a piston installed in the cylinder and moved in a longitudinal direction by hydraulic pressure, frictional plates provided on a circumferential inner surface of the forward first speed clutch drum and spaced apart from each other; and frictional disks coupled to a circumferential outer surface of a forward first speed coupling, which extends inside the forward first speed clutch drum, the frictional disks alternating with the frictional plates.

Furthermore, a differential gear casing of the differential gear unit may have: a left differential gear casing inserted into the forward first speed clutch part and splined to the forward first speed coupling; and a right differential gear casing inserted into and splined to the output driven gear.

Moreover, the output part may further have a one-way clutch part, including: a one-way bearing fitted over a portion of a circumferential outer surface of the output driven gear other than a toothed surface thereof; a one-way bearing outer ring fitted over a circumferential outer surface of the one-way bearing to receive the one-way bearing therein; frictional disks coupled to a circumferential outer surface of the one-way bearing outer ring and spaced apart from each other; frictional plates coupled to the housing and alternating with the frictional disks; and a piston installed in a cylinder, defined by the housing, to compress both the frictional disks and the frictional plates, so that, while the heavy machinery moves forwards or is in a neutral position, when hydraulic pressure is selectively supplied, the frictional disks and the frictional plates are compressed by the piston, so that the one-way bearing outer ring is stopped, thus the output driven gear is allowed to rotate in a forward direction while reverse rotation thereof is restrained by the one-way bearing. Therefore, when the heavy machinery is in a neutral gear position or conducts a gear shift operation in order to move forwards when in a stopped state on an upward slope, the heavy machinery is prevented from being momentarily moved backwards.

The above and other objects, features and other advantages of the present invention will be more clearly understood from the following detailed description taken in conjunction with the accompanying drawings. Terms and words used in the specification and claims must be regarded as concepts selected by the inventor as the best method of illustrating the present invention, and must be interpreted as having meanings and concepts adapted to the scope and sprit of the present invention for understanding the technology of the present invention.

BRIEF DESCRIPTION OF THE DRAWINGS

FIGS. 8 through 9a and 9b are a sectional view showing an enlargement of a one-way clutch part and sectional views taken along line E-E' of FIG. 8 showing the operation of the one-way clutch part when the heavy machinery moves in a forward speed or is in a neutral position, and when it moves backwards.

DETAILED DESCRIPTION OF THE EMBODIMENT

Figure 1:
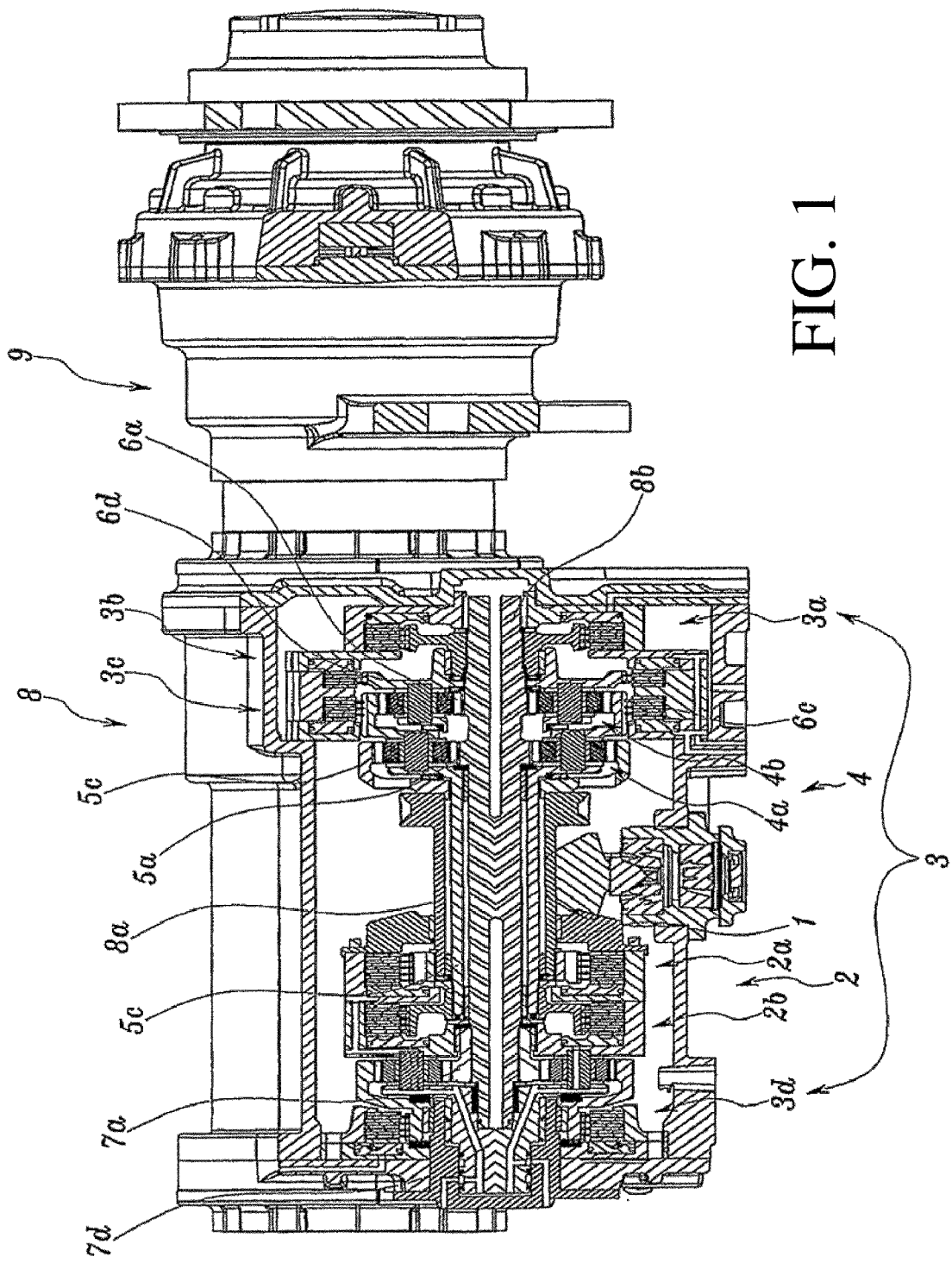
FIG. 1 is a sectional view showing a conventional multi-stage transmission.

Hereinafter, a preferred embodiment of the present invention will be described in detail with reference to the attached drawings. Reference should now be made to the drawings, in which the same reference numerals are used throughout the different drawings to designate the same or similar components. The sizes of elements may be exaggerated to more clearly and conveniently illustrate the present invention.

Figure 2:
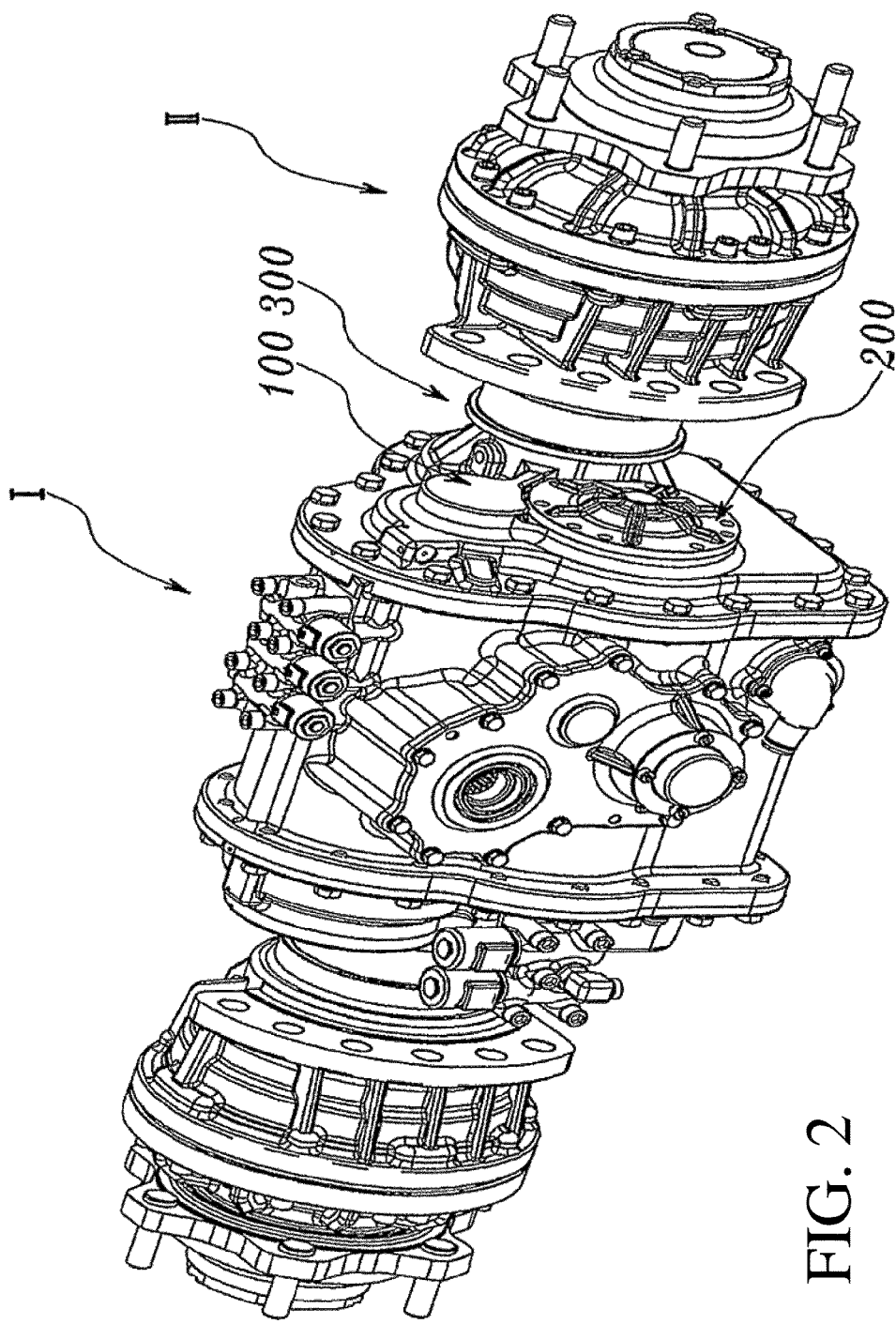
FIG. 2 is a perspective view of a triple-axle-drive multi-stage transmission for heavy machinery, according to a preferred embodiment of the present invention.
Figure 3:
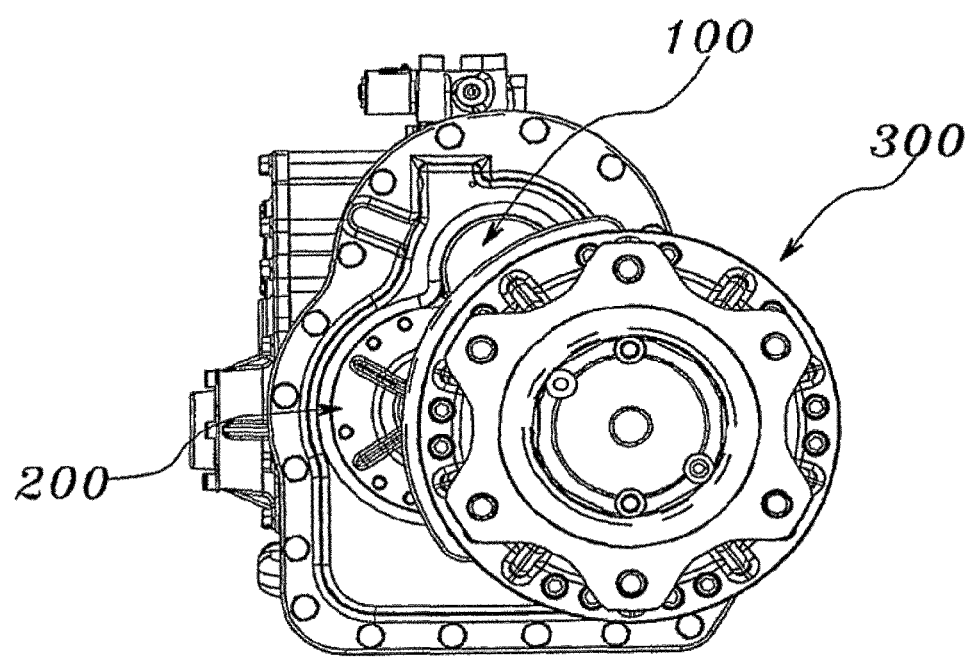
FIG. 3 is a right side view of the triple-axle-drive multi-stage transmission for heavy machinery, according to the preferred embodiment of the present invention.

As shown in a perspective view, a side view and a sectional view of FIGS. 2 through 4, a triple-axle-drive transmission for heavy machinery (hereinafter, referred to simply as "transmission I") according to the preferred embodiment of the present invention includes an input part 100, which receives the power of an engine through a bevel gear unit and selectively transmits power in a forward or reverse gear direction, a speed changing part 200, which conducts a multistage speed changing function having three forward gears and two reverse gears, and an output part 300, which outputs the transmitted power to a wheel drive part n through a differential gear unit 30a.

Figure 4:
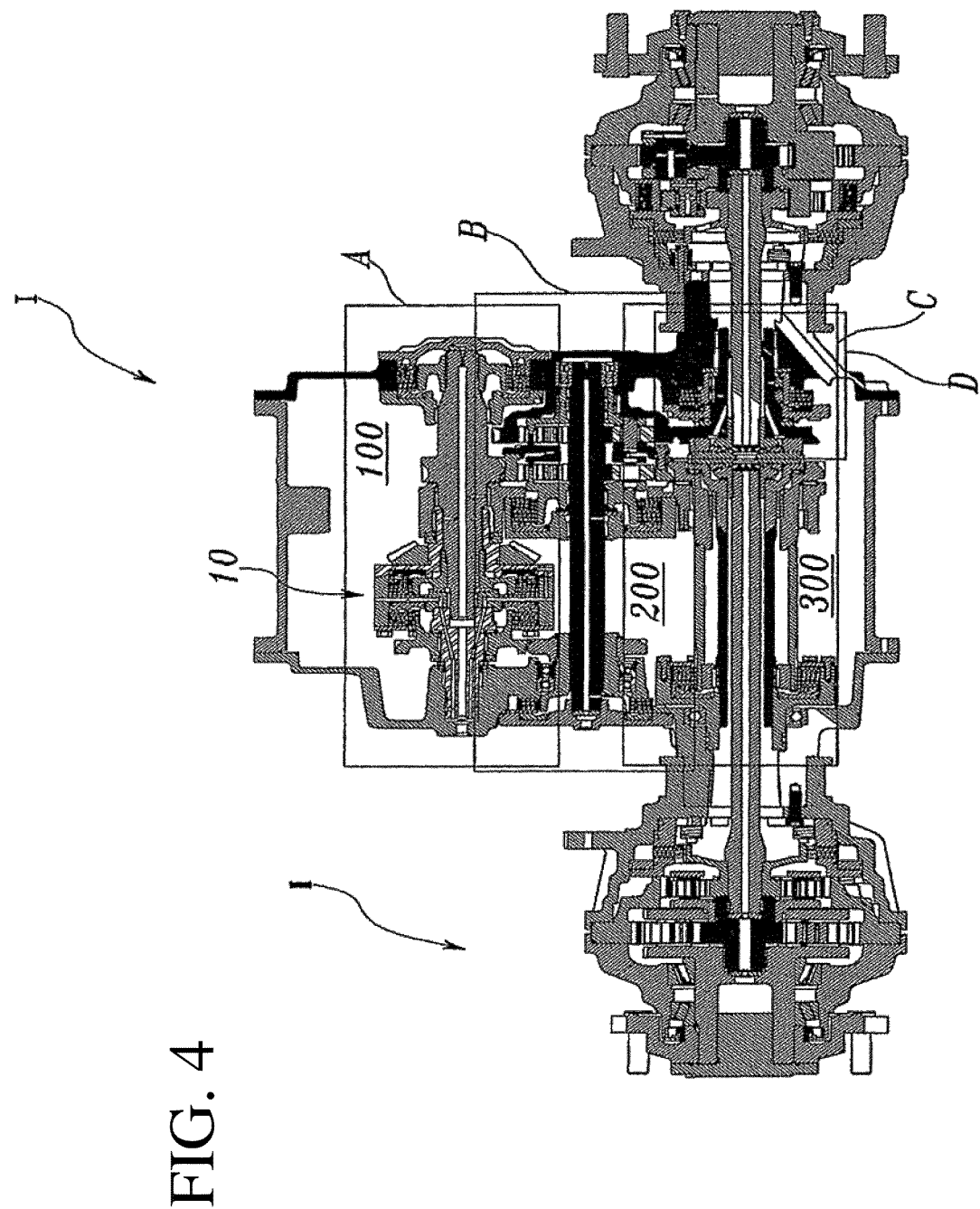
FIG. 4 is a sectional view of the triple-axle-drive multistage transmission for heavy machinery, according to the preferred embodiment of the present invention.
Figure 5:
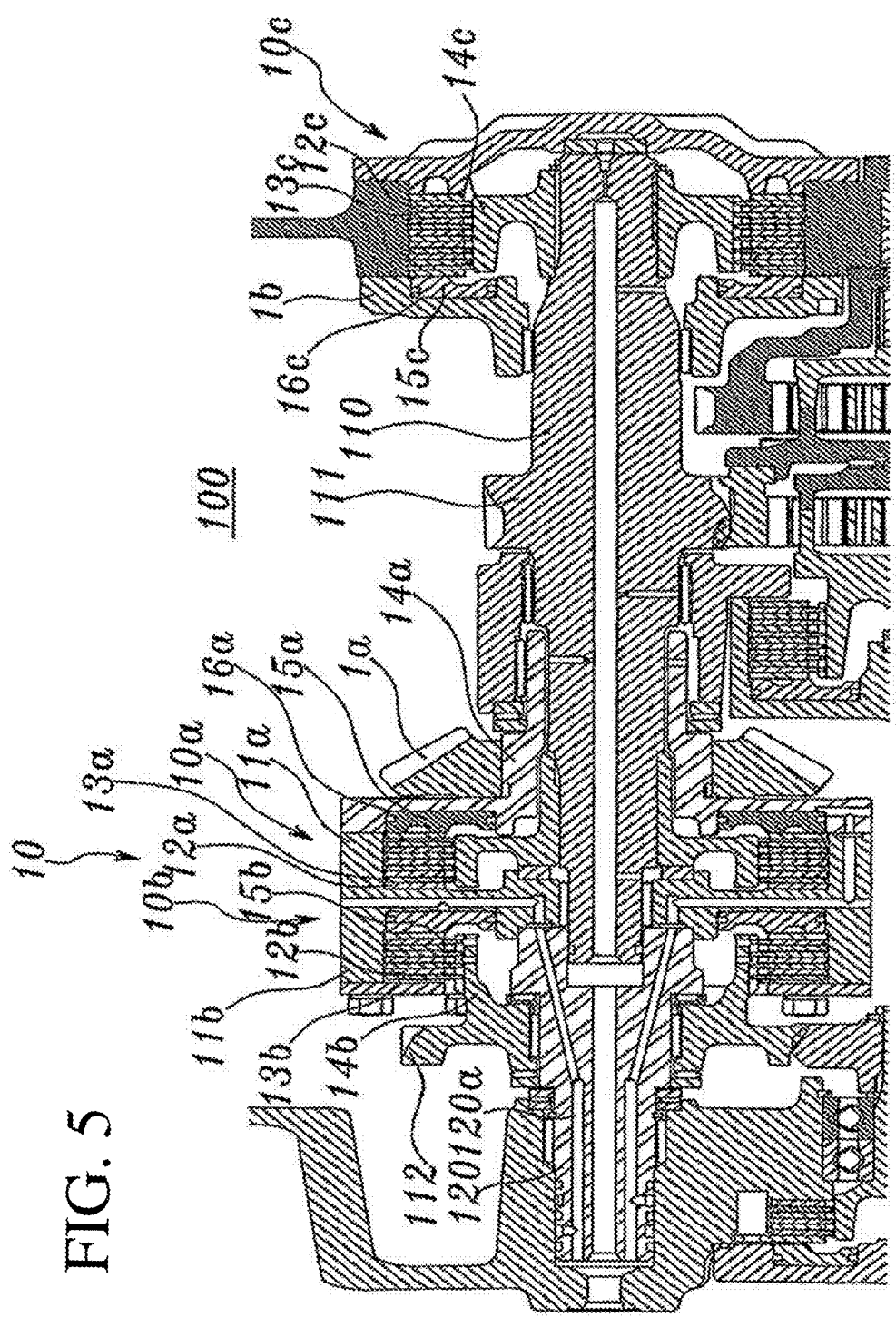
FIGS. 5 through 7 are sectional views showing enlargements of an input part, a speed changing part and an output part of the triple-axle-drive multistage transmission for heavy machinery, according to the preferred embodiment of the present invention.
Figure 6:
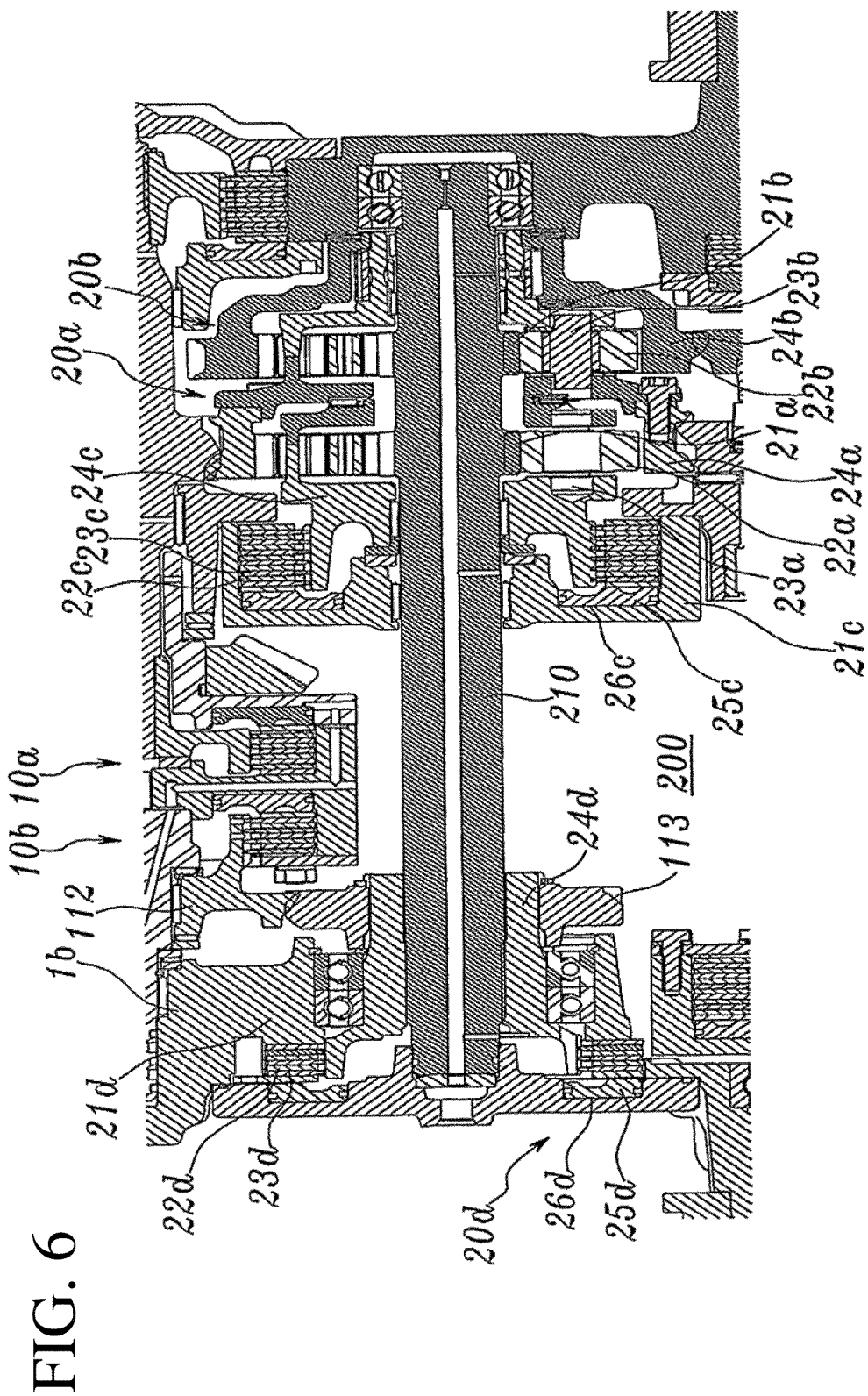
Figure 7:
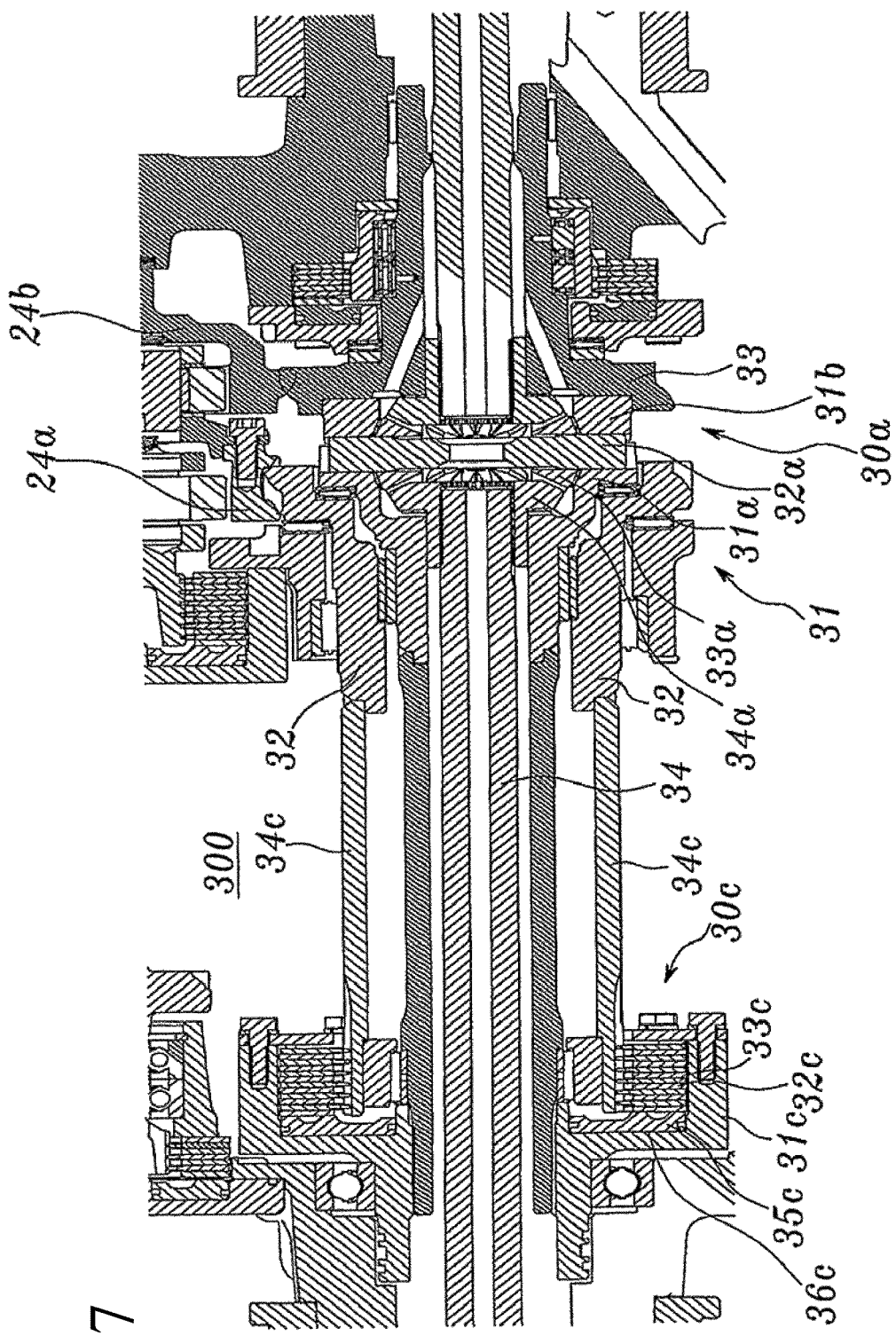

FIGS. 5 through 7 are views respectively showing enlargements of blocks A, B and C corresponding to the input part, the speed changing part and the output part. The coupling relationship among the components will be explained in detail with reference to these drawings. First, the input part 100 will be explained with reference to the enlarged view of the input part 100 of FIG. 5 corresponding to the block A of FIG. 4.

The input part 100 includes an input drive shaft 110, which serves as a medium of power transmission, a hydraulic pressure supply shaft 120, which is adjacent to the first end of the input drive shaft 110 and has therein a passage 120a for the supply of hydraulic pressure, and a bevel gear unit that has a bevel ring gear 1a, which engages with a bevel pinion gear (not shown) that receives power from a torque converter (not shown) coupled to an engine output shaft (not shown) and thus receives the rotating power of the engine in a perpendicular direction. Furthermore, the input drive shaft 110 is inserted into a bevel ring gear 1a, but they are spaced apart from each other. The input part 100 further includes a clutch part 10, which is integrally coupled to and is rotated along with the bevel ring gear 1a and selectively transmits power, input into the bevel ring gear 1a, to the input drive shaft 110 using hydraulic pressure depending on whether the vehicle is in a forward or reverse speed.

The clutch part 10 includes a forward clutch part 10a, which is coupled to one side of the bevel ring gear 1a and controls power transmission when the vehicle moves forwards, and a reverse clutch part 10b, which is adjacent to the forward clutch part 10a and controls power transmission when the vehicle moves backwards.

The forward clutch part 10a and the reverse clutch part 10b respectively include a hollow forward clutch drum 11a and a hollow reverse clutch drum lib, which have cylinders in first ends thereof, a ring-shaped forward piston 15a and a ring-shaped reverse piston 15b, which are supported by springs (not shown) and respectively installed in the cylinders 16a and 16b and move in longitudinal directions using hydraulic oil, and ring-shaped frictional plates 12a and 12b, which are respectively coupled to the circumferential inner surfaces of second ends of the forward clutch drum 11a and the reverse clutch drum 11b and are spaced apart from each other at regular intervals. Furthermore, the forward clutch part 10a and the reverse clutch part 10b respectively include a forward coupling 14a, which is integrally coupled to the input drive shaft 110 and extends inside the forward clutch drum 11a, and a reverse coupling 14b, which extends inside the reverse clutch drum 11b and is integrated with a reverse drive gear 112 that rotates independently from the input drive shaft 110. The forward clutch part 10a and the reverse clutch part 10b further include ring-shaped frictional disks 13a and 13b, which are respectively coupled to the circumferential outer surfaces of the forward coupling 14a and the reverse coupling 14b and are spaced apart from each other. The frictional disks 13a and 13b and the frictional plates 12a and 12b are alternately arranged and spaced apart from each other by regular intervals.

Meanwhile, a forward drive gear 111 and the reverse drive gear 112 are respectively provided on the input drive shaft 110 and a hydraulic pressure supply shaft. The forward drive gear 111 and the reverse drive gear 112 respectively transmit power, which is transmitted from the forward clutch part 10a or the reverse clutch part 10b to the input drive shaft 110, to a first ring gear 24a and a reverse driven gear 113 of the speed changing part 200 using gear teeth formed on the circumferential outer surfaces of the forward drive gear 111 and the reverse drive gear 112. Preferably, the forward drive gear 111 is integrated with the input drive shaft 110, and the reverse drive gear 112 is inserted into the hydraulic pressure supply shaft 120 and supported by a bearing. The reverse drive gear 112 and the reverse coupling 14b may be integrated with each other.

Furthermore, an input drive shaft stopping clutch 10c is provided on the input drive shaft 110 to restrain the rotation of the input drive shaft 110. The input drive shaft stopping clutch 10c includes ring-shaped frictional plates 12c, which are coupled to a housing 1b, an input drive shaft stopping coupling 14c, which is splined to the input drive shaft 110, ring-shaped frictional disks 13c, which are coupled to the circumferential outer surface of the input drive shaft stopping coupling 14c and are alternated with the frictional plates 12c, and a piston 15c, which is installed in a cylinder 16c, provided in an end of the housing 1b, and is movable in a longitudinal direction.

FIG. 6 is a sectional view showing an enlargement of the speed changing part 200 shown in the block B of FIG. 4. The construction of the speed changing part 200 will be explained in detail with reference to the drawing.

The speed changing part 200 includes a speed change drive shaft 210, which serves as a medium for the transmission of power, the speed of which has been changed, and a first planetary gear assembly 20a and a second planetary gear assembly 20b, which are coupled to an end of the speed change drive shaft 210 and engage with the forward drive gear 111 of the input drive shaft 110 to receive power. The speed changing part 200 further includes a reverse driven gear 113, which engages with the reverse drive gear 112 of the input drive shaft 110 to receive power, and into which a speed change drive shaft, stopping coupling 24d of a speed change drive shaft stopping clutch part 20d which will be explained later herein, is inserted and splined, the speed change drive shaft stopping clutch part 20d, which stops the speed change drive shaft 210, and a first carrier fastening clutch part 20c, which stops a first carrier shaft 23a of the first planetary gear assembly 20a.

The first planetary gear assembly 20a includes a first ring gear 24a, which has gear teeth on the circumferential outer and inner surfaces thereof and externally engages with the forward drive gear 111 of the input drive shaft 110, at least one first planetary gear 22a, which internally engages with the inner gear teeth formed on the circumferential inner surface of the first ring gear 24a, the first carrier shaft 23a, which is integrated with a rotating shaft of the first planetary gear 22a, and a first sun gear 21a, which externally engages with the first planetary gear 22a and is integrated with the speed change drive shaft 210.

The second planetary gear assembly 20b includes a second ring gear 24b, which has gear teeth on the circumferential outer and inner surfaces thereof, a second planetary gear 22b, which internally engages with the inner gear teeth of the second ring gear 24b, a second carrier shaft 23b, which is integrated with a rotating shaft of the second planetary gear 22b and is integrated at an end thereof with the first ring gear 24a of the first planetary gear assembly 20a, and a second sun gear 21b, which externally engages with the second planetary gear 22b and is integrated with the speed change drive shaft 210.

Furthermore, the first carrier shaft stopping clutch part 20c is provided adjacent to the first planetary gear assembly 20a to stop the first carrier shaft 23a of the first planetary gear assembly 20a. The first carrier shaft stopping clutch part 20c includes a hollow first carrier shaft stopping clutch drum 21c, the circumferential outer surface of which is fastened to the housing 1b, and into which the speed change drive shaft 210 is inserted so that the first carrier shaft stopping clutch drum 21c is supported on the speed change drive shaft 210 using a bearing. A cylinder 26c is provided at a first end in the first carrier shaft stopping clutch drum 21c. The first carrier shaft stopping clutch part 20c further includes a piston 25c, which is supported by a spring (not shown) and is installed in the cylinder 26c so as to be movable in a longitudinal direction in response to the supply of hydraulic pressure, ring-shaped frictional plates, which are coupled to the circumferential inner surface of the first carrier shaft stopping clutch drum 21c and are spaced apart from each other, and a first carrier shaft stopping coupling 24c, which is provided in the first carrier shaft stopping clutch drum 21c, and into which the speed change drive shaft 210 is inserted and splined. The first carrier shaft stopping coupling 24c is integrated at a first end thereof to the first carrier and has, on the circumferential outer surface of a second end thereof, frictional disks 23c, which alternate with the frictional plates 22c and are spaced apart from the frictional plates 22c at regular intervals.

Furthermore, a speed change drive shaft stopping clutch part 20d, which stops the speed changing shaft 210 and restrains rotation of the first sun gear 21a and the second gear 21b, which are integrated with the speed change drive shaft 210, is provided on an end of the speed change drive shaft 210. The speed change drive shaft stopping clutch part 20d includes a speed change drive shaft stopping clutch drum 21d, which comprises the housing 1b and has a cylinder 26d at a predetermined position therein, a piston 25d, which is installed in the cylinder 26d so as to be movable in a longitudinal direction in response to the supply of hydraulic pressure, ring-shaped frictional plates 22d, which are coupled to the circumferential inner surface of the speed change drive shaft stopping clutch drum 21d and are spaced apart from each other at regular intervals, and a speed change drive shaft stopping coupling 24d, which extends inside the speed change drive shaft stopping clutch drum 21d and has on the circumferential outer surface thereof frictional disks 23d, which alternate with the frictional plates 22d and are spaced apart from the frictional plates 22d at regular intervals. In addition, the speed change drive shaft 210 is inserted into and splined to the speed change drive shaft stopping coupling 24d, so that they are integrally operated.

Meanwhile, the speed change drive shaft stopping coupling 24d and the reverse driven gear 113 may be integrally manufactured.

FIG. 7 is a sectional view showing an enlargement of the output part 300 shown in the block C of FIG. 4.

The output part 300 serves to transmit power, the speed of which has been changed in the speed changing part 200, to the wheel drive part II through the differential gear unit 30a. The output part 300 includes the differential gear unit 30a, a forward first speed drive gear 32, a forward first speed clutch part 30c and an output driven gear 33.

The differential gear unit 30a includes a differential gear casing 31, which has a left differential gear casing 31a and a right differential gear casing 31b that are coupled to each other, a differential pinion gear 33a, which has a pinion shaft 32a, coupled to the differential gear casing 31a, as a rotating shaft thereof, and a differential side gear 34a, which engages with the differential pinion gear 33a and is coupled to a wheel shaft 34 of the wheel drive part II.

The forward first speed clutch part 30c includes a forward first clutch drum 31c, which has a cylinder 36c at a predetermined position therein, a piston 35c, which is installed in the cylinder 36c and moves in a longitudinal direction in response to the supply of hydraulic pressure, ring-shaped frictional plates 32c, which are provided on the circumferential inner surface of the forward first speed clutch drum 31c and are spaced apart from each other, and frictional disks 33c, which are coupled to the circumferential outer surface of a forward first speed coupling 34c that extends inside the forward first speed clutch drum 31c. The ring-shaped frictional plates 32c and the frictional disks 33c are alternately arranged.

Meanwhile, it is preferable that the forward first drive gear 32, which is inserted into the forward first speed coupling 34c, be splined or integrally coupled thereto.

Furthermore, the forward first speed drive gear 32 is provided between the first ring gear 24a of the speed changing part 200 and the differential gear unit 30a to transmit power, changed to a forward first speed, to the differential gear unit 30a through the left differential gear casing 31a. As well, the forward first speed drive gear 32 has gear teeth on the circumferential outer surface of a first end thereof to externally engage with the first ring gear 24a, and is splined at a second end thereof to the forward first speed coupling 34c. The forward first speed coupling 34c and the forward first speed drive gear 32 may be integrated with each other.

The output driven gear 33 transmits power, changed to one among forward and reverse speeds including forward second and third speeds and reverse first and second speeds, to the differential gear unit 30a through the right differential gear casing 31b. For this, the output driven gear 33 has gear teeth on the circumferential outer surface thereof and, thus, externally engages with the second ring gear 24b. In addition, the output driven gear 33 is formed in a hollow shape and is splined to or coupled, using bolts, to the right differential gear casing 31b, which is inserted thereinto, so that the output driven gear 33 and the right differential gear casing 31b are integrally rotated. Meanwhile, as shown in the drawing, the output driven gear 33 may be coupled to the right differential gear casing 31b using bolts, and may have gear teeth on the circumferential outer surface thereof. Alternatively, the right differential gear casing 31b may have gear teeth on the circumferential outer surface thereof, so that it can serve as the output driven gear 33.

Figure 8:
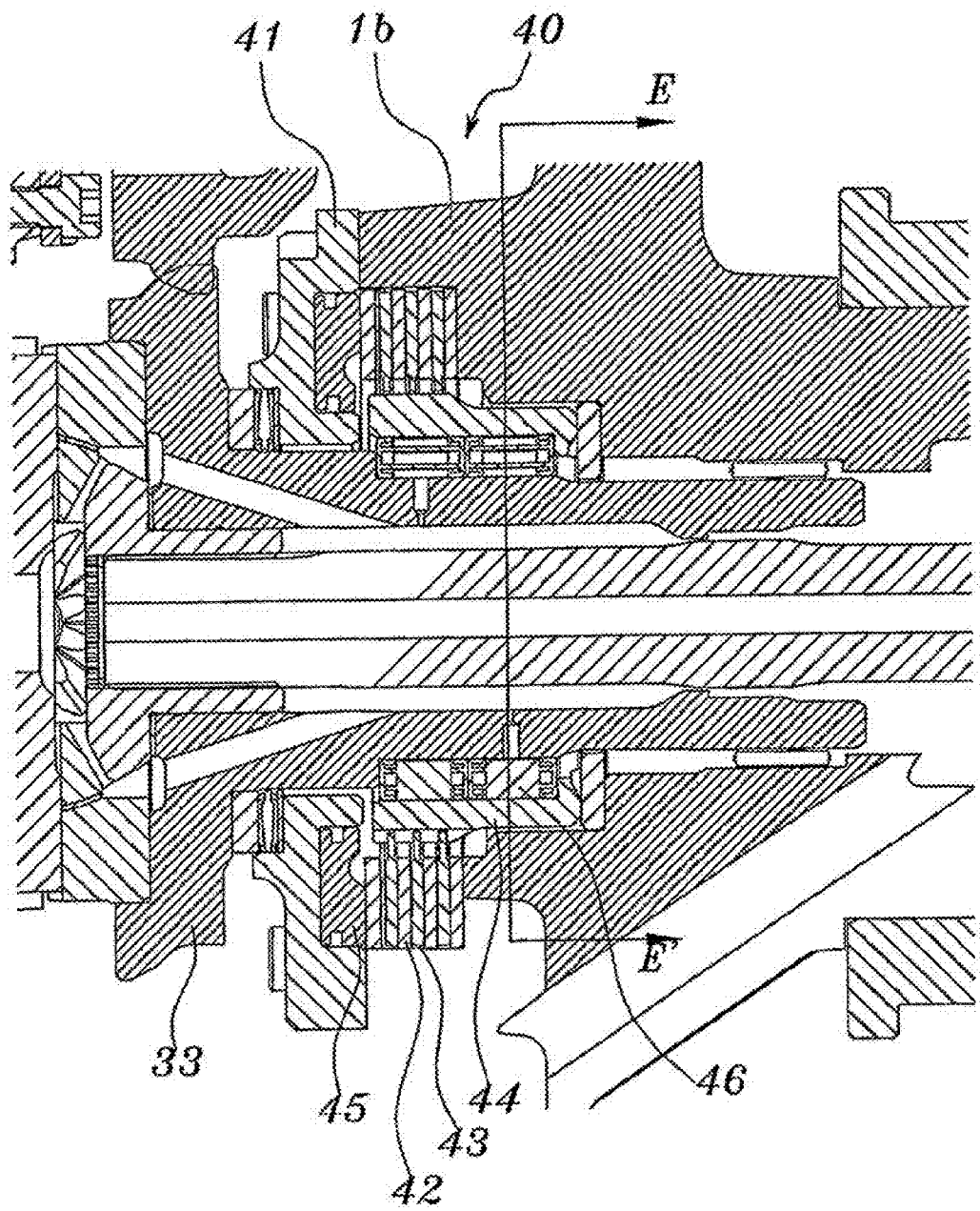
Figure 9A:
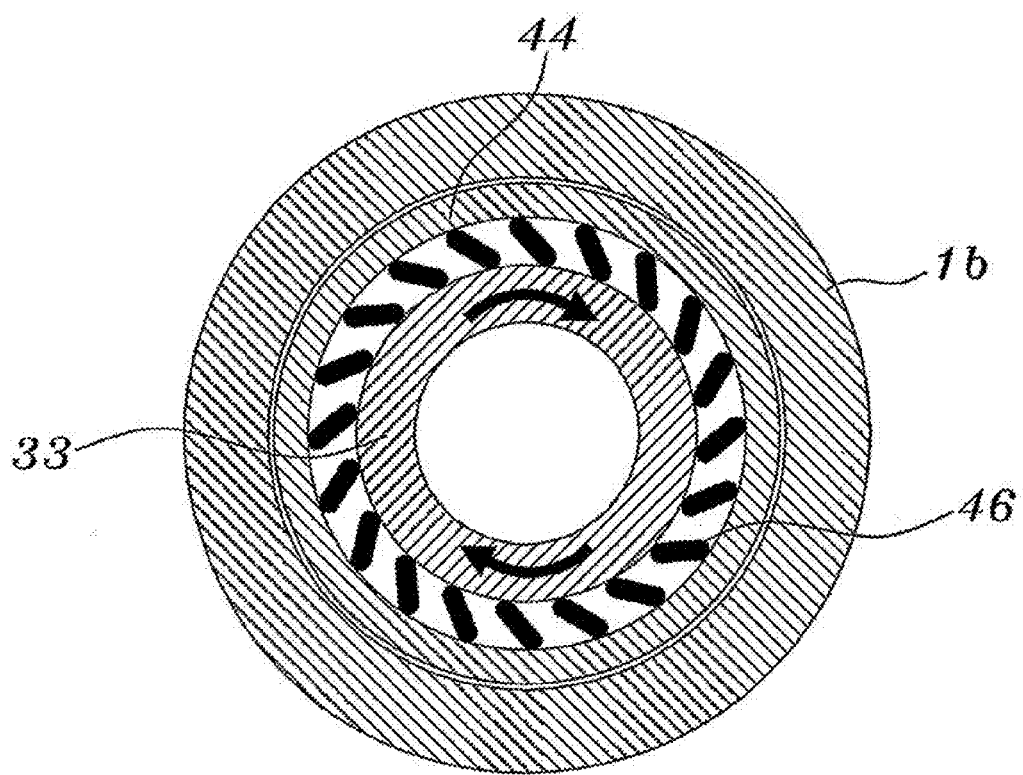
Figure 9B:
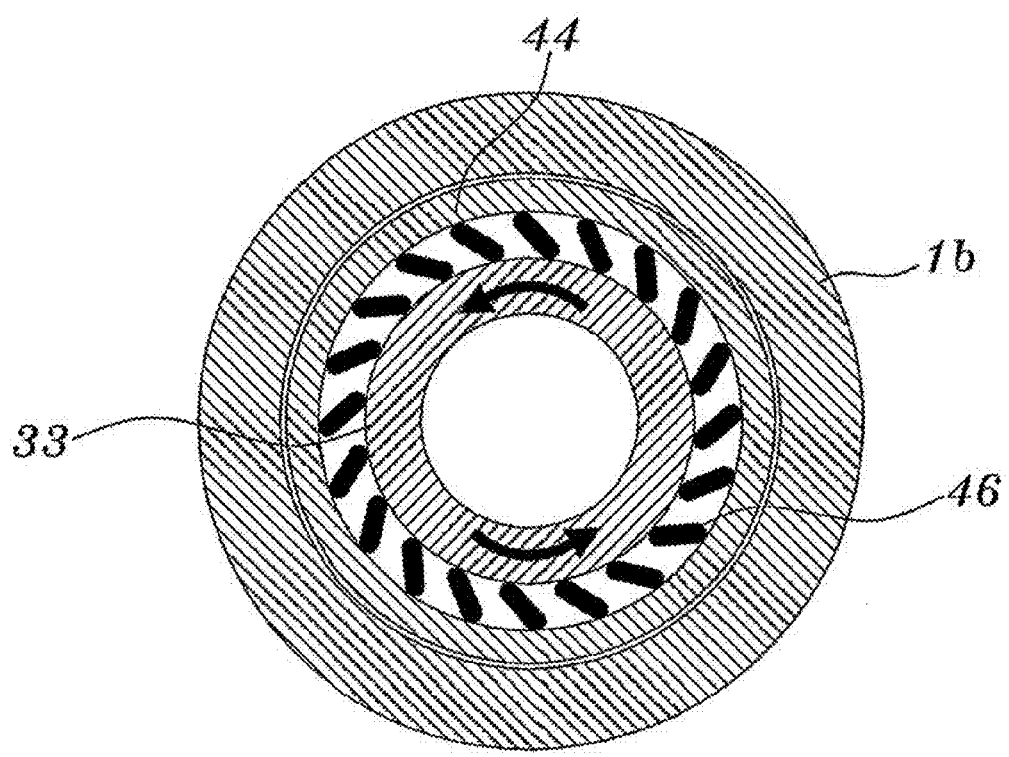

FIG. 8 is a sectional view showing an enlargement of a one-way clutch part, which is mounted to the output part and corresponds to the block D of FIG. 4. FIGS. 9a and 9b are sectional views taken along line E-E' of FIG. 8, in which FIG. 9a illustrates operation when the vehicle moves in a forward speed or is in a neutral position, and FIG. 9b illustrates the operation when the vehicle moves backwards.

First, the construction of the one-way clutch part 40 will be explained with reference to FIG. 8. The one-way clutch part 40 includes a one-way bearing 46, which is fitted over a portion of the circumferential outer surface of the output driven gear 33 other than the toothed surface thereof, and a one-way bearing outer ring 44, which is fitted over the circumferential outer surface of the one-way bearing 46, that is, receives the one-way bearing 46 therein. The one-way clutch part 40 further includes frictional disks 43, which are coupled to the circumferential outer surface of the one-way bearing outer ring 44 and are spaced apart from each other at regular intervals, frictional plates 42, which are coupled to the housing 1b and alternate with the frictional disks 43, and a piston 45, which is installed in a cylinder defined by the housing 1b and compresses both the frictional disks 43 and the frictional plates 42.

The operation of the one-way clutch part 40 when the vehicle moves in a forward speed or is in a neutral position will be explained herein below with reference to FIG. 9a. The piston 45 compresses both the frictional disks 43, which are coupled to the one-way bearing outer ring 44, and the frictional plates 42, which are coupled to the stationary housing, using hydraulic pressure, which is selectively supplied, thus fastening the one-way bearing outer ring 44 to the housing. Therefore, due to the one-way bearing 46 which restrictively allows only one-way rotation, the output driven gear 33 can rotate only in a forward direction (that is, the clockwise direction in the drawing) and is prevented from being rotated backwards.

Furthermore, because the output driven gear 33 is coupled to the wheel shaft 34 through the differential gear unit 30a, the vehicle can move only in a forward direction. Due to such a construction, particularly, when the vehicle conducts a gear shift operation to move forwards in a stopped state on an upward slope after having conducted work as desired, the one-way clutch part 40 prevents the vehicle from being momentarily moved backwards by gravity before sufficient hydraulic pressure is supplied to the forward clutch part 10a. Furthermore, even when the transmission is in the neutral position while the vehicle is on the upward slope, hydraulic pressure is supplied to the one-way clutch part 40, thus preventing the vehicle from being undesirably moved backwards.

The operation of the one-way clutch part 40 when the vehicle moves in a backward speed or is in the neutral position will be explained herein below with reference to FIG. 9b. When the transmission is shifted to the backward gear, hydraulic pressure, which has been supplied to the one-way clutch part 40, is removed, and rotation of the one-way bearing outer ring 44, which has been restricted by the housing Ib, is allowed. Thus, the output driven gear 33, the one-way bearing 46 and the one-way bearing outer ring 44 become rotatable without restriction in a counterclockwise direction with respect to the housing Ib.

Meanwhile, the one-way bearing 46 is a machine element which is used to transmit rotational speed or torque in only one direction, and a sliding bearing, a rolling bearing or the like may be used as the one-way bearing 46. In the preferred embodiment of the present invention, a sprag bearing is used.

Hereinafter, the operational relationship among the input part 100, the speed changing part 200 and the output part 300 in response to gear shifting, including forward and reverse gear shifting, will be described in detail.

Figure 10:
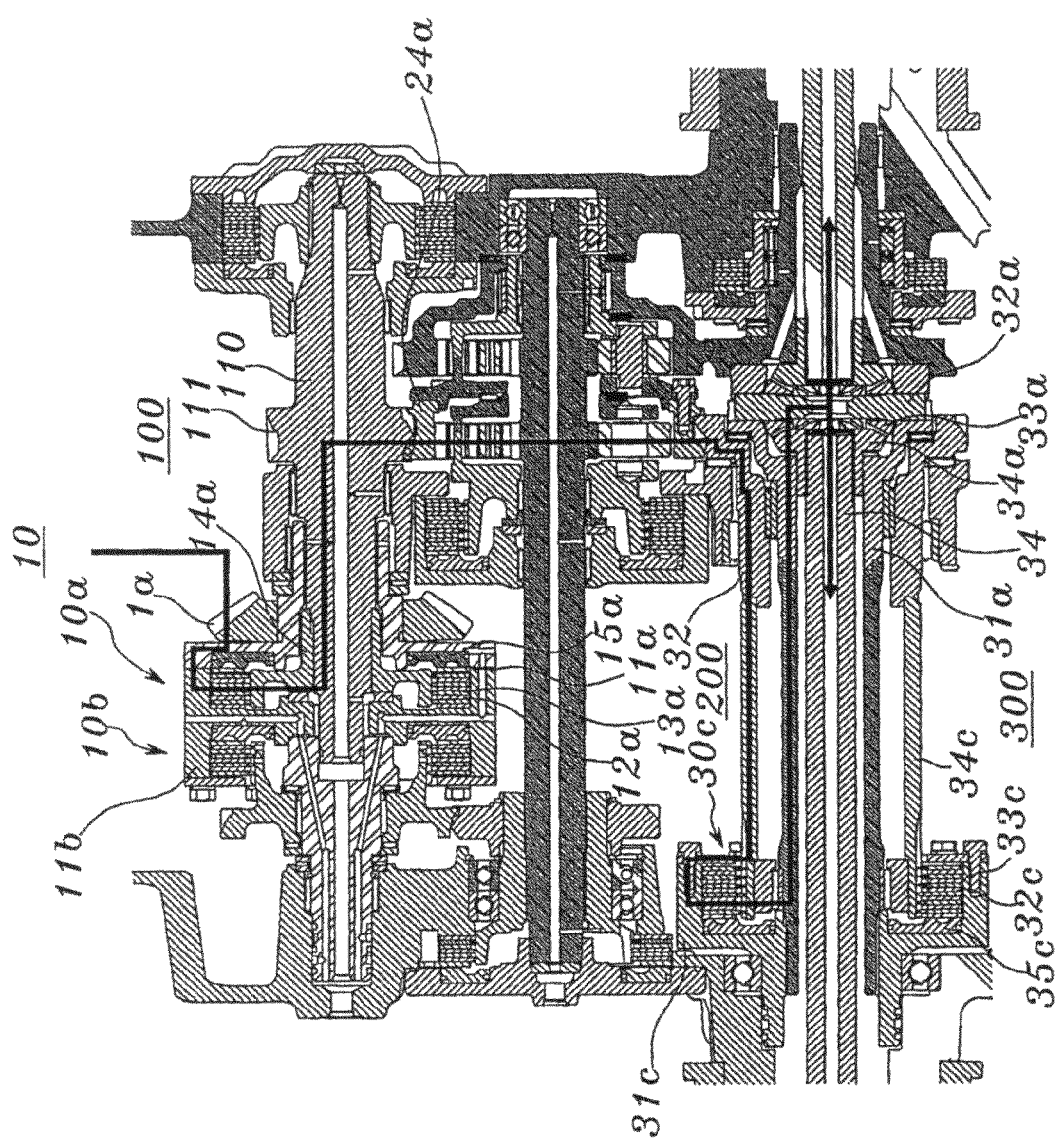
FIGS. 10 through 14 are sectional views showing the triple-axle-drive multistage transmission for heavy machinery to illustrate, using the arrows, the paths along which power is transmitted when the transmission is in first, second and third forward gears and in first and second backward gears, according to the preferred embodiment of the present invention.

FIG. 10 is a sectional view showing, using an arrow, the path along which power is transmitted when the transmission is shifted to forward first gear.

According to the path along which power is transmitted, counterclockwise rotating power, which is transmitted from the engine to the transmission through the bevel pinion gear (not shown), is first input to the bevel gear 1a of the input part 100, thus rotating the bevel gear 1a in a clockwise direction.

Here, because the clutch part 10 is coupled to the bevel ring gear 1a using bolts (not shown) so that they are integrally rotated, the forward clutch drum 11a and the reverse clutch drum 11b are rotated in a clockwise direction along with the bevel ring gear 1a. At this time, because the clutch drums 11a and 11b are spaced apart from the input drive shaft 110 by a space filled with lubricant, if no hydraulic pressure is applied to the clutch part 10, the rotating power of the engine is transmitted only to the clutch drums 11a and 1ib through the bevel ring gear 1a, and thus the clutch drums 11a and 11b and the bevel ring gear 1a rotate freely, that is, conduct no-load operation.

When hydraulic pressure is applied to the forward clutch part 10a, the hydraulic pressure moves the piston 15a to the left, so that the piston 15a compresses the frictional plates 12a, which are coupled to the circumferential inner surface of the forward clutch drum 11a, and the frictional disks 13a, which are coupled to the circumferential outer surface of the forward coupling 14a, splined to the input drive shaft 110, and alternate with the frictional plates 12a at regular intervals, to each other. Thus, the power, input to the forward clutch drum 11a, is transmitted to the forward coupling 14a through the frictional plates 12a and the frictional disks 13a. Thereby, the input drive shaft 110 is rotated in a clockwise direction.

Thereafter, the clockwise rotating power, input to the input drive shaft 110, rotates the forward drive gear 111, which is integrated with the input drive shaft 110, in a clockwise direction, and rotates the first ring gear 24a of the speed changing part 200, which externally engages with the forward drive gear 111, in a counterclockwise direction, thus being output from the input part 100 to the speed changing part 200.

Subsequently, the counterclockwise rotating power, transmitted to the first ring gear 24a of the speed changing part 200, is directly transmitted to the forward first speed drive gear 32 of the output part 300, which externally engages with the first ring gear 24a, thus rotating a forward first speed drive gear 32 in a clockwise direction.

In other words, the rotating power of the engine is first reduced in speed by the gear ratio between the bevel pinion gear (not shown) and the bevel ring gear Ia, so that torque thereof is increased. Thereafter, the power is input to the input part 100 through the forward clutch part 10a, and is changed to the forward first speed by the gear ratio between the forward drive gear 111, the first ring gear 24a of the speed changing part 200, and the forward first speed drive gear 32 of the output part 300, which externally engage with each other.

Subsequently, when hydraulic pressure for moving the piston 35c is applied to the forward first speed clutch part 30c, which is provided on the end of the forward drive gear 111, the frictional disks 33c, which are coupled to the circumferential outer surface of the end of the forward first speed drive gear 32 that extends inside the forward first speed clutch part 30c, and the frictional plates 32c, which are coupled to the circumferential inner surface of the forward first speed clutch drum 31c, are compressed together, so that the power is transmitted to the forward first speed clutch drum 31c.

As such, the clockwise rotating power, which is changed to forward first speed and is transmitted to the forward first speed clutch drum 31c, rotates, in a clockwise direction, the left differential gear casing 31a, which is splined to the forward first speed clutch drum 31c supported by the bearing on the housing, and rotates, in a clockwise direction, both the pinion shaft 32a and the differential pinion gear 33a, which rotate together in the same direction as the differential gear casing, and the differential side gear 34a, which engages with the differential pinion gear 33a. Finally, the power is transmitted to the wheel shaft 34, thus moving the vehicle in a forward first speed.

Figure 11:
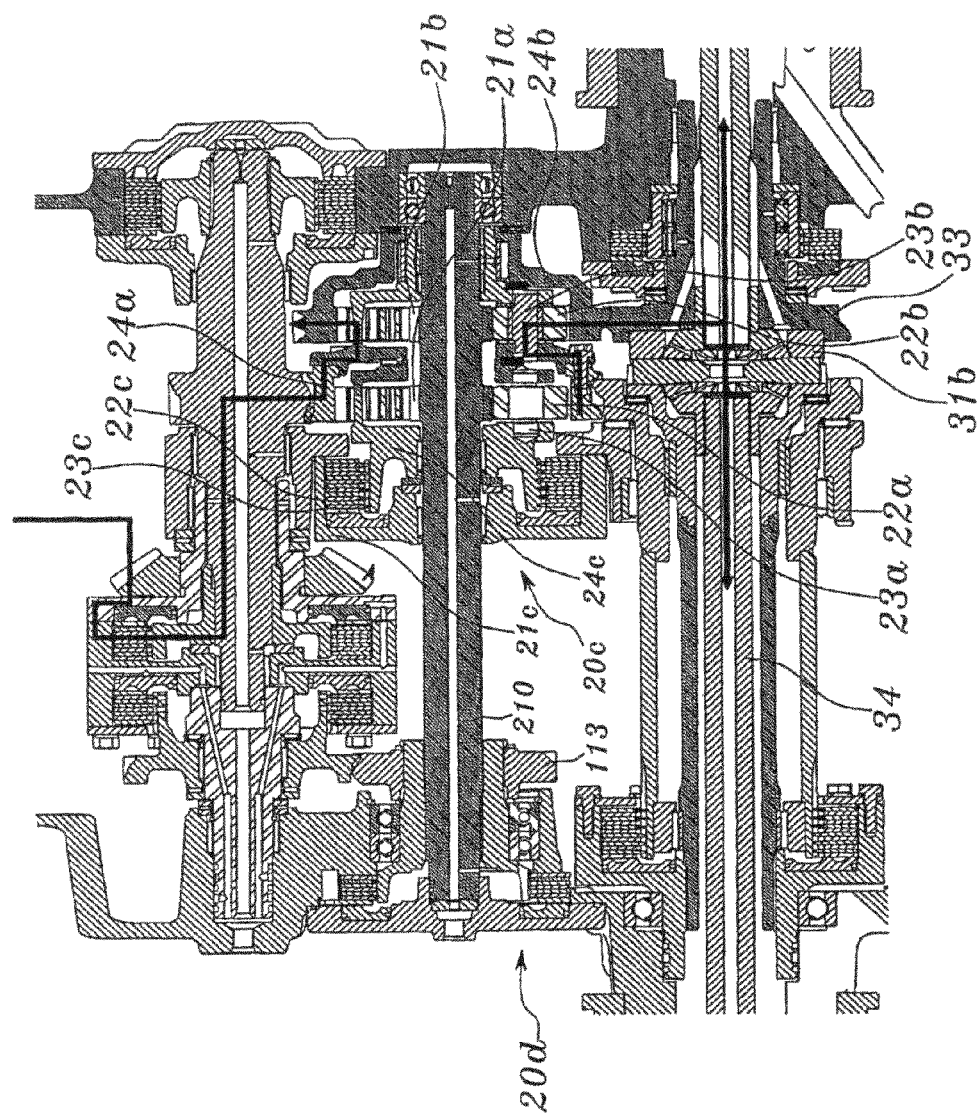

FIG. 11 is a sectional view showing, using an arrow, the path along which power is transmitted when the transmission is shifted to forward second gear.

The portion of the power transmission path along which clockwise rotating power transmitted to the input drive shaft 110 of the input part 100 is input to the first ring gear 24a of the speed changing part 200 and thus rotates the first ring gear 24a in a counterclockwise direction is the same as that when the transmission is in forward first gear.

However, unlike when the transmission is in forward first gear, forward second gear shifting is conducted through the planetary gear assemblies 20a and 20b. In particular, the first and second sun gears 21a and 21b of the first and second planetary gear assemblies 20a and 20b must be stopped, and this is implemented by stopping the speed drive shaft 210, with which the first and second sun gears 21a and 21b are integrated. Such a speed change drive shaft stopping condition is realized by supplying hydraulic pressure to the speed change drive shaft stopping clutch part 20d, which is provided on the end of the speed change drive shaft 210, and by thus stopping the reverse driven gear 113, which is splined to the speed change drive shaft 210. Thereby, the first sun gear 21a and the second sun gear 21, which are integrated with the speed change drive shaft 210, are also stopped.

As such, in the state in which the speed change drive shaft 210 is stopped and the first and second sun gears 21a and 21b are thus stopped, the counterclockwise rotating power, input to the first ring gear 24a, rotates the second carrier shaft 23b, because the first ring gear 24a is coupled to and integrally rotated with the second carrier shaft 23b. Therefore, the second planetary gear 22b is rotated in a counterclockwise direction. The second planetary gear 22b, which internally engages with the second ring gear 24b, rotates the second ring gear 24b in the same direction, that is, in a counterclockwise direction.

Meanwhile, the first planetary gear 22a, which internally engages with the first ring gear 24a, is rotated along with the first ring gear 24a, thus transmitting the rotating power to the first carrier shaft 23a, which is the rotating shaft of the first planetary gear 22a. The first carrier shaft 23a transmits the power to the first carrier shaft stopping coupling 24c, which is coupled thereto. However, because the bearing is provided between the circumferential inner surface of the first carrier shaft stopping coupling 24c and the speed change drive shaft 210, and because the frictional disks, which are coupled to the circumferential outer surface of the first carrier shaft stopping coupling 24c, and the frictional plates, which are coupled to the circumferential inner surface of the first carrier shaft stopping clutch drum 21c, are alternately arranged and spaced apart from each other at regular intervals, power can no longer be transmitted. Therefore, the power merely rotates the first carrier shaft stopping coupling 24c with no load.

Furthermore, the counterclockwise rotating power, transmitted to the second ring gear 24b, rotates the output driven gear 33, which externally engages with the second ring gear 24b, in the clockwise direction, and rotates the right differential gear casing 31b, which is integrated with the output driven gear 33, in a clockwise direction. Therefore, the; power is changed to a clockwise forward second speed and is transmitted to the wheel shaft 34 through the differential gear unit 30a, in the same manner as when in forward first speed.

That is, the rotating power of the engine, which is input to the input drive shaft 110 of the input part 100 through the forward clutch part 10a, is consecutively changed in speed by gear ratios between the forward drive gear 111 of the forward drive shaft 110 and the first ring gear 24a of the speed changing part 200, which externally engage with each other under the condition in which the speed change drive shaft 210 is stopped, between the second planetary gear 22b, which is integrally rotated with the second carrier shaft 23b, which is integrally rotated with the second ring gear 24b, and the second ring gear 24b, which engages with the second planetary gear 22b, and between the second ring gear 24b and the output driven gear 33, which externally engages with the second ring gear 24b, thus being finally output at the forward second speed.

Figure 12:
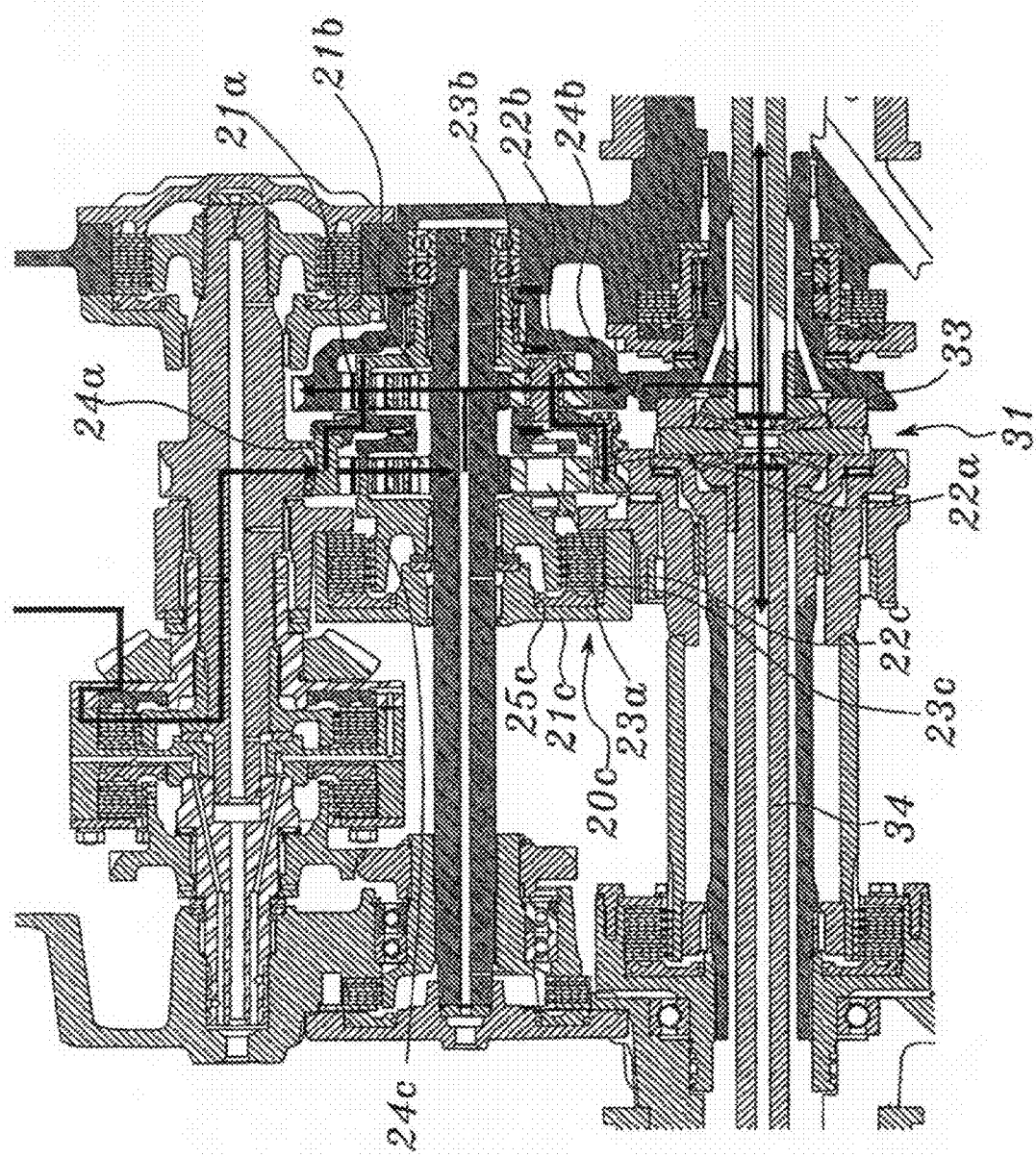

FIG. 12 is a sectional view showing, using an arrow, the path along which power is transmitted when the transmission is shifted to forward third speed.

The power transmitting process from the engine to the first ring gear 24a through the input part 100 when the transmission is in forward third speed is also the same as that when the transmission is in forward first or second speed.

However, unlike when in forward second speed, in which gear shifting is conducted by the planetary gear assemblies 20a and 20b while the speed change drive shaft 210 is stopped, in the case of the forward third speed, the first carrier shaft 23a is stopped while the speed change drive shaft 210 is rotated, that is, under the condition of stopping the first carrier shaft 23a, gear shifting is conducted.

In detail, to stop the first carrier shaft 23a, when hydraulic pressure is applied to the first carrier shaft stopping clutch part 20c, the piston is moved. Then, the piston compresses both the frictional plates 22c, which are coupled to the circumferential inner surface of the first carrier shaft stopping clutch drum 21c mounted to the housing 1b, and the frictional disks 23c, which are coupled to the circumferential outer surface of the first carrier stopping coupling 24c, which is integrated with the first carrier 23a, thus stopping the first carrier stopping coupling 24c. Thereby, the condition of stopping the first carrier shaft 23a is satisfied.

As such, in the state in which the first carrier shaft 23a is stopped, counterclockwise rotating power, input to the first ring gear 24a, rotates the first planetary gear 22a on its own axis in a counterclockwise direction, so that the first sun gear 21a, which externally engages with the first planetary gear 22a, is rotated in a clockwise direction. Thus, the speed change drive shaft 210 is rotated in a clockwise direction, so that the second sun gear 21b, which is integrated with the speed change drive shaft 210, is rotated in a clockwise direction. Thereby, the second planetary gear 22b is rotated on its own axis in a counterclockwise direction.

Furthermore, because the first ring gear 24a is integrated with and rotated along with the second carrier shaft 23b, the second carrier 23b is rotated in a counterclockwise direction. Thereby, the second planetary gear 22b, which has the second carrier shaft 23b as the rotating shaft thereof, revolves around the second carrier shaft 23b in a counterclockwise direction, and simultaneously rotates on its own axis.

Therefore, unlike the case of being in forward second speed, in which the rotating speed of the second planetary gear 22b, resulting only from the rotation of the second carrier shaft 23b, is output to the second ring gear 24b, the rotation of the second planetary gear 22b, resulting from the rotation of the second sun gear 21b, and the rotation of the second planetary gear 22b, resulting from the revolution of the second carrier shaft 23b, are combined, so that the rotating speed thereof is doubled. Thus, this outputs counterclockwise rotating power through the second ring 24b, which internally engages with the second planetary gear 22b.

That is, the rotating power of the engine, which is input to the input drive shaft 110 of the input part 100 through the forward clutch part 10a, is consecutively changed in speed by gear ratios between the forward drive gear 111 of the forward drive shaft 110 and the first ring gear 24a of the speed changing part 200, which externally engage with each other, between the first planetary gear assembly 20a and the second planetary gear assembly 20b, which engage with each other under the condition in which the first carrier shaft 23a is stopped, and between the second ring gear 24b and the output driven gear 33, which externally engages with the second ring gear 24b, thus being finally output to forward third speed.

Meanwhile, the path along which the power output from the second ring gear 24b is transmitted to the wheel shaft 34 through the output driven gear 33 and the differential gear unit 30a is the same as that when in the forward second speed.

Figure 13:
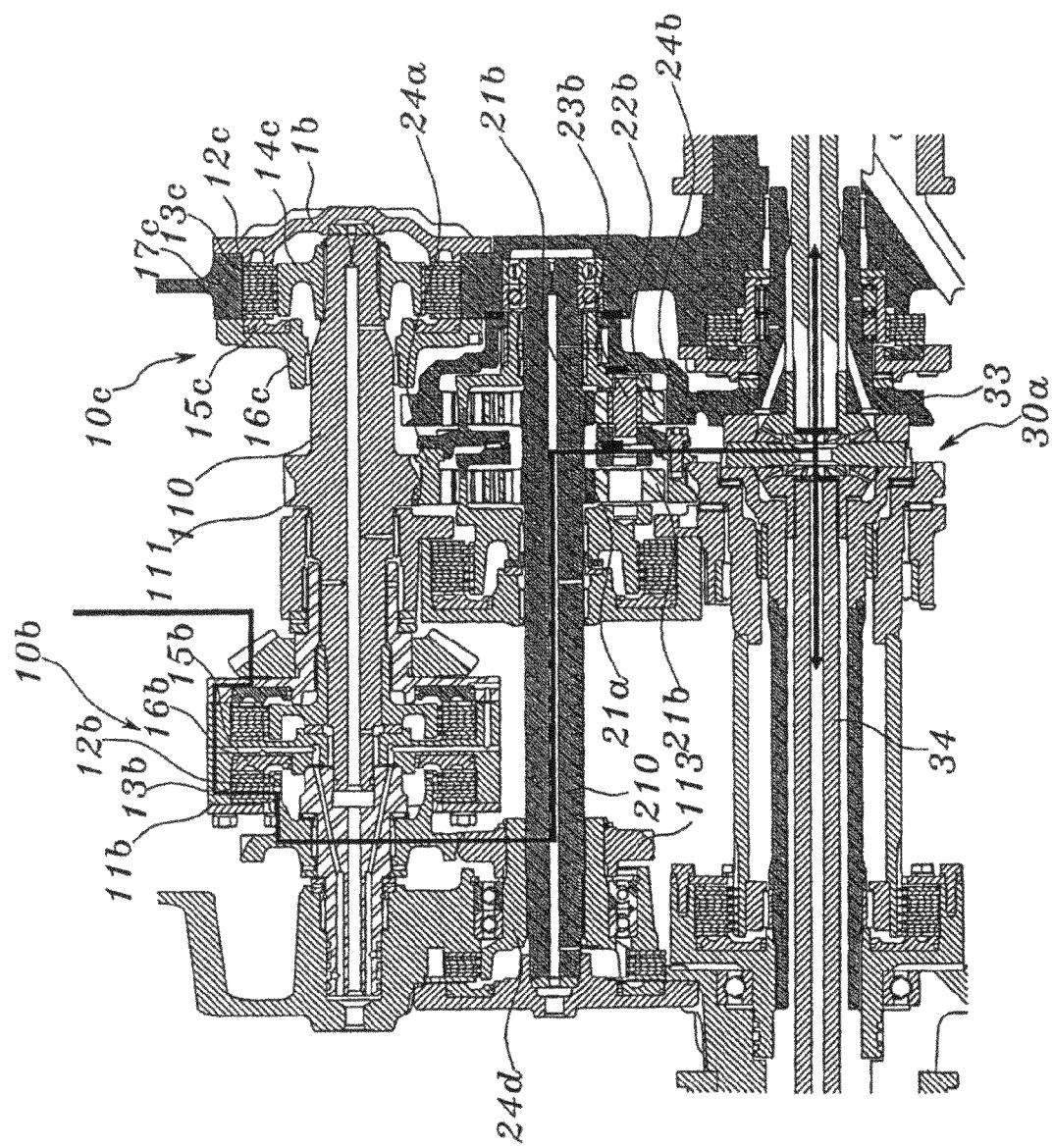

FIG. 13 is a sectional view showing, using an arrow, the path along which power is transmitted when the transmission is shifted to reverse first gear. Gear shifting in reverse first speed will be explained with reference to the drawing.

First, when the vehicle moves backwards, hydraulic pressure is applied only to the reverse clutch part 10b, but no hydraulic pressure is applied to the forward clutch part 10a. The hydraulic pressure, applied to the reverse clutch part 10b, moves the piston, which is installed in the cylinder of the reverse clutch drum lib, thus compressing both the frictional plates, which are coupled to the circumferential inner surface of the reverse clutch drum lib, and the friction disks, which are coupled to the circumferential outer surface of the first end of the reverse drive gear 112 extending inside the reverse clutch drum lib, and alternate with and are spaced apart from the frictional plates at regular intervals. Therefore, the power input from the engine through the bevel pinion gear and the bevel ring gear 1a is transmitted to the reverse drive gear 112 through the reverse clutch part 10b.

Furthermore, because the second end of the reverse drive gear 112, which has the gear teeth on the circumferential outer surface of the second end thereof, externally engages with the reverse driven gear 113, which is splined to the speed change drive shaft 210 of the speed changing part 200, the clockwise rotating power transmitted to the reverse drive gear 112 rotates the reverse driven gear 113 in a counterclockwise direction, so that both the speed change drive shaft stopping coupling 24d, splined to the reverse driven gear 113, and the speed change drive shaft 210, splined to the speed change drive shaft stopping coupling 24d, are rotated in a counterclockwise direction.

Meanwhile, gear shifting to reverse first speed must be conducted in the state in which the second carrier shaft 23b (or the first ring gear 24a, which is integrated therewith) is stopped. Such condition of stopping the second carrier shaft 23b can be satisfied by stopping the forward drive gear 111 of the input drive shaft 110 which externally engages with the second carrier shaft 23b.

To achieve the above-mentioned purpose, hydraulic pressure, applied to the input drive shaft stopping clutch part 10c provided on the end of the input drive shaft 110, moves the piston 15c and thus compresses both the frictional plates 12c, which are coupled to the housing 1b, and the frictional disks 13c, which are coupled to the input drive shaft stopping coupling 14c, thereby stopping the input drive shaft stopping coupling 14c. Therefore, the input drive shaft 110, splined to the input drive shaft stopping coupling 14c, is prevented from rotating. As a result, both the forward drive gear 111, which is integrated with the input drive shaft 110, and the second carrier shaft 23b, which externally engages with the forward drive gear 111, are stopped.

As such, under the condition of stopping the second carrier shaft 23b, the rotating power, which is transmitted from the reverse drive gear 112 of the input drive shaft 110 and rotates the speed change drive shaft 210 in a counterclockwise direction, rotates the first planetary gear 22a and the second planetary gear 22b in a clockwise direction through the first and second sun gears 21a and 21b.

Thereafter, the rotating power, which is transmitted to the first planetary gear 22a through the rotation of the first sun gear 21a, rotates the first carrier shaft 23a in a counterclockwise direction and thus rotates only the first planetary gear 22a with no load, without rotating the forward drive gear 111 which engages with the first ring gear 24a, because the first ring gear 24a is stopped.

However, the rotating power, which is transmitted to the second planetary gear 22b of the second sun gear 21b, rotates the second planetary gear 22b in a clockwise direction in the state in which the second carrier shaft 23b is stopped by the stopped first ring gear 24a, so that the second ring gear 24b, which internally engages with the second planetary gear 22b, and the output driven gear 33, which externally engages with the second ring gear 24b, are rotated, thus the rotating power is changed to counterclockwise reverse first speed by the gear ratio therebetween, and is transmitted to the wheel shaft 34 through the differential gear unit 30a.

That is, under the condition in which the input drive shaft 110 is stopped so that the first ring gear 24a or the second carrier shaft 23b is stopped, the rotating power of the engine, which is input to the input drive shaft 110 of the input part 100 through the reverse clutch part 10b, is consecutively changed in speed by gear ratios both between the reverse drive gear 112 of the input drive shaft 110 and the reverse driven gear 113 of the speed changing part 200, which externally engage with each other, and between the second planetary gear assembly 20b and the output driven gear 33, which externally engages with the second ring gear 24b of the second planetary gear assembly 20b, thus being finally output at reverse first speed.

Figure 14:
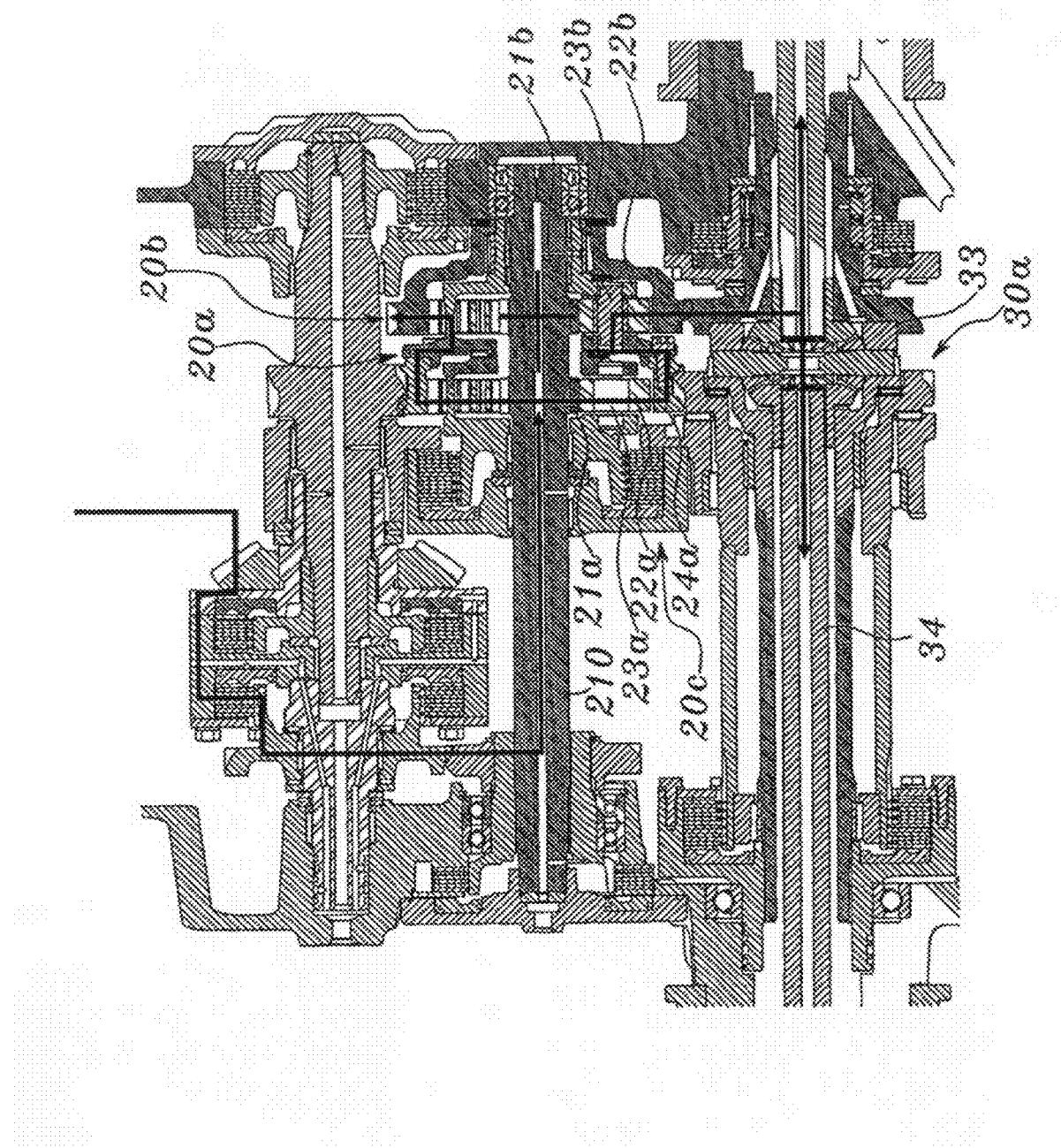

FIG. 14 is a sectional view showing, using an arrow, the path along which power is transmitted when the transmission is shifted to reverse second gear. The case of reverse second gear will be explained with reference to this drawing. The path along which the power of the engine input to the bevel ring gear 1a is transmitted to the reverse driven gear 113 and the speed change drive shaft 210 of the speed changing part 200 through the reverse clutch part 10b and the reverse drive gear 112 of the input part 100 is the same as that when in reverse first speed.

However, gear shifting to reverse second speed is conducted through the first and second planetary gear assemblies 20a and 20b in the state in which the first carrier shaft 23a is stopped by hydraulic pressure applied to the first carrier shaft stopping clutch part 20c, in a manner similar to that of the gear shifting to forward third speed.

In detail, in the state such that the first carrier shaft 23a is stopped, the counterclockwise rotating power input to the speed change drive shaft 210 rotates the first sun gear 21a and the second sun gear 21b in a counterclockwise direction. Thus, the first planetary gear 22a is rotated on its own axis in a clockwise direction by the rotation of the first sun gear 21a in the state such that the first carrier shaft 23a is stopped, so that the first ring gear 24a is rotated on its own axis in a clockwise direction.

Furthermore, because the first ring gear 24a is integrated with the second carrier shaft 23b, the second planetary gear 22b revolves around the second carrier shaft 23b in a clockwise direction. In addition, because the counterclockwise rotating power of the second sun gear 21b rotates the second planetary gear 22b on its own axis, the clockwise rotating speed of the second planetary gear 22b is doubled by the rotation both of the second ring gear 24b (the second carrier shaft 23b) and of the second sun gear 21b. The rotating power, increased in speed, is output through the second ring gear 24b.

Subsequently, the process in which the power, changed to counterclockwise reverse second speed, is transmitted to the wheel shaft 34 through the second ring gear 24b, the output driven gear 33 and the differential gear unit 30a, is the same as that of the gear shifting to reverse first speed.

As such, under the condition in which the first carrier shaft 23a is stopped, the rotating power of the engine, which is input to the input drive shaft 110 of the input part 100, is consecutively changed in speed by gear ratios between the reverse drive gear 112 of the input drive shaft 110 and the reverse driven gear 113 of the speed changing part 200, which externally engage with each other, between the first planetary gear assembly 20a and the second planetary gear assembly 20b, and between the second ring gear 24b of the second planetary gear assembly 20b and the output driven gear 33, which externally engages with the second ring gear 24b, thus being finally output at counterclockwise reverse second speed.

Although the preferred embodiment of the present invention has been disclosed for illustrative purposes, the present invention is not limited to the construction and operation thereof, which are explained with reference to the drawings. Those skilled in the art will appreciate that various modifications, additions and substitutions are possible, without departing from the scope and spirit of the invention as disclosed in the accompanying claims. Therefore, such modifications, additions and substitutions must be regarded as falling within the bounds of the present invention.

As described above, the present invention provides a transmission for heavy machinery which includes a bevel gear unit, a transmission part and a differential gear unit, sequentially integrated into a single body, so that a separate space for the transmission is not required, thus enhancing spatial freedom in designing a vehicle. Furthermore, because the power transmission structure can be simplified, the weight of the vehicle and the number of elements are markedly reduced, and gear shift shock caused when the transmission is changed to forward or reverse gear is markedly reduced.

Moreover, the transmission for heavy machinery according to the present invention is advantageous in that, because an input drive shaft and a speed change drive shaft are separately provided, the structural strength and the operational stability are enhanced. In addition, the present invention has an advantage in that the reduction gear ratio is more easily determined because gears provided on the input drive shaft and the speed change drive shaft are externally engaged.

As well, because a one-way clutch part is provided between a housing and the differential gear unit of an output part, when the vehicle is in a neutral gear position or conducts a gear shift operation in order to move forwards when in a stopped state on an upward slope, the vehicle is prevented from being momentarily moved backwards.

What is claimed is:

1. A triple-axle-drive multistage transmission for heavy machinery, which is disposed between a bevel gear unit, receiving power from a torque converter coupled to an output shaft of an engine, and a differential gear unit, coupled to a wheel shaft to output the power, changed in speed, the triple-axle-drive multistage transmission comprising:
    an input part, comprising a clutch part including a forward clutch part and a reverse clutch part to control transmission of the power received from the bevel gear unit depending on whether the heavy machinery moves forwards or backwards, an input drive shaft coupled to the forward clutch part to mediate forward power transmission, a forward drive gear provided on a first end of the input drive shaft to transmit forward power, an input drive shaft stopping unit to restrain rotation of the input drive shaft, and a reverse drive gear coupled to the reverse clutch part to transmit backward power; and
    a speed changing part, comprising a speed change drive shaft to mediate a change of speed of the power input from the input part, a planetary gear unit coupled to a first end of the speed changed drive shaft and having a first planetary gear assembly and a second planetary gear assembly, which respectively include first and second ring gears, first and second planetary gears, first and second carrier shafts and the first and second sun gears, to receive the power from the forward drive gear, a reverse driven gear provided on a second end of the speed change drive shaft and engaging with the reverse drive gear to transmit the input power to the speed change drive shaft, and a speed change drive shaft stopping unit and a first carrier shaft stopping unit to respectively restrain rotation of the speed change drive shaft and the first carrier shaft of the first planetary gear assembly, wherein the power, changed in speed, through the planetary gear unit, is output to the wheel shaft through the differential gear unit.

2. The triple-axle-drive multistage transmission for heavy machinery according to claim 1, further comprising:
    an output part, comprising a forward first speed drive gear to receive the power, changed to forward first speed, from the first ring gear of the first planetary gear assembly, an output driven gear to receive the power, changed in speed, from the second ring gear of the second planetary gear assembly, the differential gear unit to receive the power, changed in speed, from the forward first speed drive gear and the output driven gear and to output the power to the wheel shaft, and a forward first speed clutch part to selectively transmit the power, changed to forward first speed through the forward first speed drive gear, to the differential gear unit.

3. The triple-axle-drive multistage transmission for the heavy machinery according to claim 1, wherein the forward clutch part and the reverse clutch part respectively comprise:
    a hollow forward clutch drum and a hollow reverse clutch drum, which have cylinders in first ends thereof;
    a forward piston and a reverse piston, which are supported by springs and are respectively installed in the cylinders and move in longitudinal directions using hydraulic oil;
    frictional plates, which are respectively coupled to circumferential inner surfaces of second ends of the forward clutch drum and the reverse clutch drum and are spaced apart from each other;
    a forward coupling, which is integrally coupled to the input drive shaft and extends inside the forward clutch drum, and a reverse coupling, which extends inside the reverse clutch drum and is integrated with a reverse drive gear that rotates independently from the input drive shaft; and
    frictional disks, which are respectively coupled to circumferential outer surfaces of the forward coupling and the reverse coupling and alternate with and are spaced apart from the respective frictional plates at regular intervals.

4. The triple-axle-drive multistage transmission for the heavy machinery according to claim 1, wherein the input part further comprises a hydraulic pressure supply shaft, which is provided on the first end of the input drive shaft and has therein a passage to supply hydraulic pressure to the clutch part.

5. The triple-axle-drive multistage transmission for the heavy machinery according to claim 1, wherein the input drive shaft stopping unit, the speed change drive shaft stopping unit and the first carrier shaft stopping unit respectively comprise:
    frictional plates, which are coupled to a housing;
    an input drive shaft stopping coupling, a speed change drive shaft stopping coupling, and a first carrier shaft stopping coupling, which are respectively splined to the input drive shaft, the speed change drive shaft and the first carrier shaft;
    frictional disks, which are respectively coupled to circumferential outer surfaces of the input drive shaft stopping coupling, the speed change drive shaft stopping coupling and the first carrier shaft stopping coupling and respectively alternate with the frictional plates; and
    pistons, which are respectively installed in cylinders, provided at predetermined positions in a housing, and are movable in longitudinal directions.

6. The triple-axle-drive multistage transmission for the heavy machinery according to claim 2, wherein the forward first speed clutch part comprises:
    a forward first clutch drum having a cylinder at a predetermined position therein, a piston installed in the cylinder and moved in a longitudinal direction by hydraulic pressure, and frictional plates provided on a circumferential inner surface of the forward first speed clutch drum and spaced apart from each other; and
    frictional disks coupled to a circumferential outer surface of a forward first speed coupling, which extends inside the forward first speed clutch drum, the frictional disks alternating with the frictional plates.

7. The triple-axle-drive multistage transmission for the heavy machinery according to claim 2, wherein a differential gear casing of the differential gear unit comprises:
- a left differential gear casing inserted into the forward first speed clutch part and splined to a forward first speed coupling; and
- a right differential gear casing inserted into and splined to the output driven gear.

8. The triple-axle-drive multistage transmission for the heavy machinery according to claim 2, wherein the output part further comprises a one-way clutch part, including: a one-way bearing fitted over a portion of a circumferential outer surface of the output driven gear other than a toothed surface thereof; a one-way bearing outer ring fitted over a circumferential outer surface of the one-way bearing to receive the one-way bearing therein; frictional disks coupled to a circumferential outer surface of the one-way bearing outer ring and spaced apart from each other; frictional plates coupled to the housing and alternating with the frictional disks; and a piston installed in a cylinder, defined by the housing, to compress both the frictional disks and the frictional plates, so that, while the heavy machinery moves forwards or is in a neutral position, when hydraulic pressure is selectively supplied, the frictional disks and the frictional plates are compressed by the piston, so that the one-way bearing outer ring is stopped, thus the output driven gear is allowed to rotate in a forward direction while reverse rotation thereof is restrained by the one-way bearing.

* * * * *